United States Patent
Bhatnagar et al.

(10) Patent No.: US 11,937,150 B2
(45) Date of Patent: Mar. 19, 2024

(54) METHOD AND FUNCTION FOR HANDLING A SUBSCRIBER'S COMMUNICATION SERVICES

(71) Applicant: Telefonaktiebolaget LM Ericsson (publ), Stockholm (SE)

(72) Inventors: Gaurav Bhatnagar, Delhi (IN); Saurabh Gupta, Etawah (IN); Robert Törnkvist, Karlskrona (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 382 days.

(21) Appl. No.: 17/413,038

(22) PCT Filed: Dec. 12, 2018

(86) PCT No.: PCT/EP2018/084499
§ 371 (c)(1),
(2) Date: Jun. 11, 2021

(87) PCT Pub. No.: WO2020/119900
PCT Pub. Date: Jun. 18, 2020

(65) Prior Publication Data
US 2022/0022011 A1  Jan. 20, 2022

(51) Int. Cl.
*H04W 4/24* (2018.01)
*H04M 17/00* (2006.01)
*H04W 8/18* (2009.01)

(52) U.S. Cl.
CPC ............. *H04W 4/24* (2013.01); *H04M 17/20* (2013.01); *H04W 8/18* (2013.01)

(58) Field of Classification Search
CPC ......... H04W 4/24; H04W 8/18; H04M 17/20; H04M 15/852; H04M 15/785; H04M 15/8228; H04M 15/854; H04L 12/14
See application file for complete search history.

(56) References Cited

U.S. PATENT DOCUMENTS

| | | | |
|---|---|---|---|
| 9,049,590 B1* | 6/2015 | Hirschman | ....... H04M 15/7652 |
| 2004/0019539 A1 | 1/2004 | Raman et al. | |

(Continued)

FOREIGN PATENT DOCUMENTS

| | | |
|---|---|---|
| CN | 102144372 A | 8/2011 |
| CN | 107078915 A | 8/2017 |

(Continued)

OTHER PUBLICATIONS

"3GPP TS 32.240 V15.3.0", 3rd Generation Partnership Project; Technical Specification Group Services and System Aspects; Telecommunication management; Charging management; Charging architecture and principles (Release 15), Sep. 2018, pp. 1-60.

(Continued)

*Primary Examiner* — Minjung Kim
(74) *Attorney, Agent, or Firm* — Murphy, Bilak & Homiller, PLLC

(57) ABSTRACT

The embodiments herein relate to a method performed by a charging function (125) for handling a subscriber's communication services. The charging function (125) detects that a subscriber's credit account has reached or fallen below a credit threshold when the subscriber has multiple ongoing communication services consuming credit from the credit account. The charging function (125) sends a threshold notification to a UE (101) on which the subscriber has at least one of the multiple ongoing communication services. The charging function (125) determines if a response to the threshold notification has been received with prioritization of one of the multiple ongoing communication services. If a response with prioritization of one communication service has been received, the charging function (125) initiates termination of all ongoing communication services except the prioritized communication service, and provides all (Continued)

available credit to be available for the prioritized communication service.

16 Claims, 13 Drawing Sheets

(56) References Cited

U.S. PATENT DOCUMENTS

| | | |
|---|---|---|
| 2007/0041536 A1 | 2/2007 | Koskinen et al. |
| 2009/0081996 A1* | 3/2009 | Duggal ............... H04L 67/306 |
| | | 455/406 |
| 2011/0161248 A1 | 6/2011 | Cai et al. |
| 2016/0100063 A1 | 4/2016 | Tasker et al. |
| 2017/0030733 A1* | 2/2017 | Burton ............... G01C 21/3461 |
| 2018/0167517 A1* | 6/2018 | Rolfe ............... H04M 15/765 |
| 2023/0046839 A1* | 2/2023 | Raleigh ............... H04M 15/83 |

FOREIGN PATENT DOCUMENTS

| | | |
|---|---|---|
| EP | 2114032 A1 | 11/2009 |
| EP | 2816792 A1 | 12/2014 |
| EP | 3316517 A1 | 5/2018 |
| WO | 2013142331 A1 | 9/2013 |

OTHER PUBLICATIONS

"3GPP TS 32.299 V15.2.0", 3rd Generation Partnership Project; Technical Specification Group Services and System Aspects; Telecommunication management; Charging Management; Diameter charging applications (Release 15), Mar. 2018, pp. 1-200.

"3GPP TS 32.299 V15.4.0", 3rd Generation Partnership Project; Technical Specification Group Services and System Aspects; Telecommunication management; Charging Management; Diameter charging applications (Release 15), Sep. 2018, pp. 1-206.

Hakala, H., et al., "Diameter Credit-Control Application", Network Working Group, Request for Comments: 4006, Category: Standards Track, Aug. 2005, pp. 1-114.

* cited by examiner

METHOD AND FUNCTION FOR HANDLING A SUBSCRIBER'S COMMUNICATION SERVICES

TECHNICAL FIELD

Embodiments herein relate generally to a charging node, a method performed by the charging node, a User Equipment (UE) and a method performed by the UE. More particularly the embodiments herein relate to handling a subscriber's communication services.

BACKGROUND

Online Charging is a billing methodology in telecommunication networks where charging information for network resource usage is collected in parallel along with the resource usage. 3GPP TS 32.299 V15.4.0 (2018-09) defines online charging as a "charging mechanism where charging information can affect, in real-time, the service rendered and therefore a direct interaction of the charging mechanism with session/service control is required". The opposite of online charging is offline charging, and this is defined as a "charging mechanism where charging information does not affect, in real-time, the service rendered".

FIG. 1a from section 4.2 of 3GPP TS 32.240 V15.3.0 (2018-09) illustrates an example of a high level common charging architecture applicable to all 3GPP network domains, subsystems and services. Note that FIG. 1a only provides a common logical view of the charging architecture and information flows for offline and online charging. The content of the dash dotted box with reference number 100a is applicable to the fourth Generation (4G) communication technology and the content of the dashed box with reference number 100b is applicable to the fifth Generation (5G) communication technology. 4G 100a comprises a rectangle illustrating offline charging 102a and another rectangle illustrating online charging 102b. 5G 100b comprises a rectangle illustrating converged online offline charging 102c.

FIG. 1a shows a billing domain 103 which is applicable to both 4G 100a and 5G 100b. The billing domain 103 provides charging information to the network.

For the offline charging 102a in 4G 100a, the billing domain 103 illustrated in FIG. 1a is adapted to be connected, via a Bx interface, to a Charging Gateway Function (CGF) 104. The CGF 104 is adapted to be connected to, via a Ga interface, to a Charging Data Function (CDF) 105. The CDF 105 is adapted to be connected to, via a Rf interface, to Network Elements (NE) 106. For online charging 102b in 4G 100a, the billing domain 103 is adapted to be connected, via the Bx interface, to a Online Charging System (OCS) 107. The OCS 107 is adapted to be connected to, via a Ro interface, to the NE 106.

For 5G 100b which has converged online offline charging 102c, the billing domain 103 is adapted to be connected, via the Bx interface, to the OCS 107. The OCS 107 in 5G 100b is adapted to be connected to, vi a Nchf interface, Network Functions (NF) 108.

Both 4G and 5G comprise methods for handling credit authorizations. 5G provides a method to reserve and commit credit of subscriber's credit account for a service which being used. In 5G, this is achieved by using the following REST based requests of the Nchf_ConvergedCharging service:

Nchf_ConvergedCharging_Create
Nchf_ConvergedCharging_Update
Nchf_ConvergedCharging_Release 4G provides a method to reserve and commit credit of subscriber's account for a service being used. This is achieved in 4G by using the following diameter based requests:

Credit-Control-Request (CCR)
Credit-Control-Answer (CCA)

Today smart phones or feature phones are capable of running multiple services concurrently. For instance, it is always possible that mobile applications installed on a subscriber phone, i.e. the UE 101, is consuming data in the background while the subscriber is making a long distance international call and at the same time some mobile application is sending a status SMS message to a remote server. Thus, these various services are being used by the subscriber in parallel and also charges are being deducted concurrently from subscriber's account. This may lead to reaching the low balance condition of the subscriber's account. The low balance condition may occur when a credit threshold has been reached or fallen below. The term low balance condition and credit threshold may be used interchangeably herein.

Consider the following scenario as an example:

John is an active prepaid subscriber in US having a mobile phone. John is a busy person and likes to multitask to save time. He has a Facebook application on his mobile phone which continuously synchronizes with Facebook servers to get the latest updates about his friends. He is also actively involved in share trading and has an application which continuously gets the latest updates from NASDAQ. These applications continuously consume credit of his prepaid account in real time. John also needs to talk to one of his business associate Mohan which is in India for some important business requirements. On a weekend, John makes a long-distance International call to Mohan and as he is talking, his account balance is getting consumed. Some minutes later, John's account balance reaches the threshold of low balance and he begins getting low balance indicators on his mobile phone. With the current technology, John has two options when the low balance threshold is reached. He is either forced to abort the call early or to do a refill so that he has sufficient balance to continue his communication.

From a 5G network point of view also, if John is using 2 different network slices for 2 different services consuming money from same balance account, he might also face the above described problem if his balance reaches a low balance condition.

Therefore, there is a need to at least mitigate or solve this issue.

SUMMARY

An objective of embodiments herein is therefore to obviate at least one of the above disadvantages and to improve handling of a subscriber's communication services.

According to a first aspect, the object is achieved by a method performed by a charging function for handling a subscriber's communication services. The charging function detects that a subscriber's credit account has reached or fallen below a credit threshold when the subscriber has multiple ongoing communication services consuming credit from the credit account. The charging function sends a threshold notification of the reached or fallen below credit threshold to a UE on which the subscriber has at least one of the multiple ongoing communication services. The charging function determines if a response to the threshold notification has been received from the UE with prioritization of one of the multiple ongoing communication services. If a response with prioritization of one communication service has been received, the charging function initiates termination of all ongoing communication services except the prioritized communication service and provides at least substantially all available credit to be available for the prioritized communication service.

According to a second aspect, the object is achieved by a method performed by a UE for handling a subscriber's communication services. The subscriber has at least one of multiple ongoing communications services ongoing on the UE. The UE receives, from a charging function, a threshold notification of that the subscriber's credit account has reached or fallen below a credit threshold for multiple ongoing communication services consuming credit from the same credit account.

According to a third aspect, the object is achieved by a charging function configured to detect that a subscriber's credit account has reached or fallen below a credit threshold when the subscriber has multiple ongoing communication services consuming credit from the credit account. The charging function is configured to send a threshold notification of the reached or fallen below credit threshold to a UE on which the subscriber has at least one of the multiple ongoing communication services. The charging function is configured to determine if a response to the threshold notification has been received from the UE with prioritization of one of the multiple ongoing communication services. The charging function is configured to, if a response with prioritization of one communication service has been received, initiate termination of all ongoing communication services except the prioritized communication service, and to provide at least substantially all available credit to be available for the prioritized communication service.

According to a fourth aspect, the object is achieved by a UE configured to receive, from a charging function, a threshold notification of that the subscriber's credit account has reached or fallen below a credit threshold for multiple ongoing communication services on the UE consuming credit from the same credit account.

Thanks to the prioritization of one of the multiple ongoing communication services by the UE, the communication service which is considered most important by the subscriber using the UE can continue when a credit threshold of the subscriber's credit account has been reached or fallen below. Consequently, the handling of the subscriber's communication service is improved.

Embodiments herein afford many advantages, of which a non-exhaustive list of examples follows:

One advantage of the embodiments herein is that they enable the system to gracefully handle a low balance condition which increases the user experience.

Another advantage of the embodiments herein is that it increases the user's convenience. The embodiments herein allows the user to focus on current task on his UE, for instance the user can continue talking in a voice call without manually aborting other services, which are consuming his account balance and thus continues his talk without any interruption.

Furthermore, an advantage of the embodiments herein is that they increase the user experience. The user can provide a priority for a prepaid service like voice, data and SMS over others. In case of contention of resource during a low balance condition, the service with highest priority is automatically continued by taking credit units from all other ongoing services. The user will then be able to use the prioritized service for a maximum time depending on the user's account balance.

Another advantage of the embodiments herein is that as a human, the user's attention span is limited to one ongoing activity and the fallback position of the embodiments herein enables prioritization of an ongoing activity without any manual intervention. This allows the user to focus on his current task, for instance the ongoing voice call, and all the remaining credit balance in the user's account is made available to the ongoing prioritized service.

A further advantage of the embodiments herein is that they also help in saving energy and power as any further communication request for credit resources will be blocked in case of the low balance condition, leading to reduced energy consumption.

The embodiments herein are not limited to the features and advantages mentioned above. A person skilled in the art will recognize additional features and advantages upon reading the following detailed description.

BRIEF DESCRIPTION OF THE DRAWINGS

The embodiments herein will now be further described in more detail by way of example only in the following detailed description by reference to the appended drawings illustrating the embodiments and in which:

FIG. 2b is a continuation of FIG. 2a.

FIG. 5b is a continuation of FIG. 5a.

The drawings are not necessarily to scale and the dimensions of certain features may have been exaggerated for the sake of clarity. Emphasis is instead placed upon illustrating the principle of the embodiments herein.

DETAILED DESCRIPTION

With the embodiments herein, in case of low balance, the subscriber may like to prioritize one service over all other ongoing services such that only prioritized service continues while all other ongoing services are disrupted. Current charging protocols and standards do not provide method for a subscriber to provide his preferences or priority of service continuation when the credit of the subscriber is low. Prepaid subscribers do not have a choice in giving preference to a service over other ongoing services when multiple services are running concurrently, and this becomes important when the subscriber's account reaches the low balance condition during the consumption.

Continuing with the example above with John who makes a long-distance International call to this friend Mohan in India, and as he is talking, his account balance is getting consumed. Some minutes later, John's account balance reaches the threshold of low balance and he begins getting low balance indicators on his mobile phone. At this point of time, John wants to prioritize his ongoing voice call over all other ongoing services for the remaining credit units in his account such that all other ongoing communications from his mobile phone are stopped, and so that he can continue with his international call for the maximum time allowed. John would like to have this option at runtime, e.g. during the ongoing call, where he is asked for this input and all other communication except the ongoing voice call from his mobile phone are denied credit units from his account. This allows John to consume his remaining account balance for his ongoing voice call with Mohan dedicatedly. John may also like to configure this priority for voice call in case of low balance condition as part of a setting in his account.

Figure 1A:
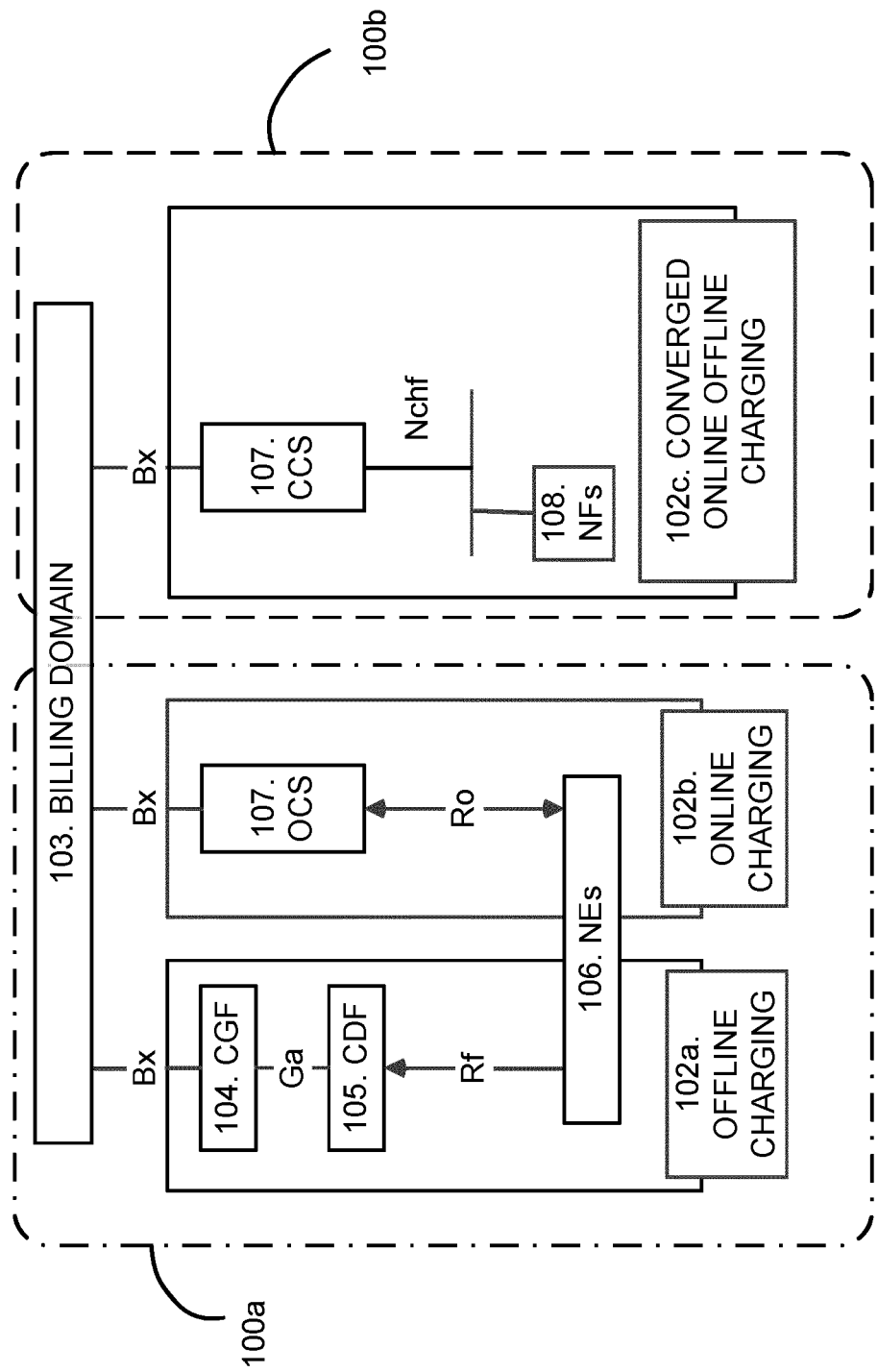
FIG. 1a is a schematic block diagram illustrating a charging architecture.
Figure 1B:
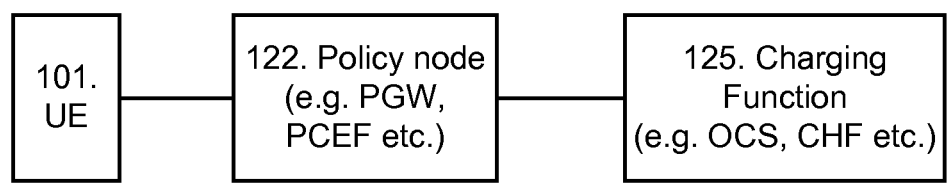
FIG. 1b is a schematic block diagram illustrating a communication system architecture.

FIG. 1b depicts a communications system in which embodiments herein may be implemented. The communications system may in some embodiments apply to one or more radio access technologies such as for example Second Generation (2G), Third Generation (3G), Fourth Generation (4G), Fifth Generation (5G), or any other Third Generation Partnership Project (3GPP) radio access technology, or other radio access technologies such as e.g. WLAN.

The communication system comprises the UE 101 which is adapted to be connected to and communicate with a policy node 122. The policy node 122 may be for example a PGW or a PCEF. The policy node 122 is adapted to be connected to and communicate with a charging function 125. The charging function 125 may be for example an OCS 107 or a CHF. The charging function 125 may be implemented in or performed by a node, a device or any other suitable apparatus.

The UE 101 may be a device by which a subscriber may access services offered by an operator's network and services outside operator's network to which the operator's radio access network and core network provide access, e.g. access to the Internet. The UE 101 may be any device, mobile or stationary, enabled to communicate in the communications network, for instance but not limited to e.g. user equipment, mobile phone, smart phone, sensors, meters, vehicles, household appliances, medical appliances, media players, cameras, Machine to Machine (M2M) device, Device to Device (D2D) device, Internet of Things (IoT) device, terminal device, communication device or any type of consumer electronic, for instance but not limited to television, radio, lighting arrangements, tablet computer, laptop or Personal Computer (PC). The UE 101 may be portable, pocket storable, hand held, computer comprised, or vehicle mounted devices, enabled to communicate voice and/or data, via the radio access network, with another entity, such as another UE or a server.

A subscriber may be defined as a user of a UE 101 which is subscribing to a communication service which provides access to an operator's communication network using mobile communication technology. The subscription may be identified with an ID. The terms subscriber and user may be used interchangeably herein. The subscriber may have a credit account from which the operator charges the subscriber for its use of communication services. The credit account may be a pre-paid or a post-paid type of account.

The subscriber may have one or a plurality of UEs 101 to which the same credit account is associated, i.e. the subscriber's subscription may be associated with one or a plurality of UEs 101. With this, the user may have multiple ongoing communication services on one or multiple UEs 101 that is charged from the same credit account.

It should be noted that the communication links in the communications system 100 may be of any suitable kind including either a wired or wireless link. The link may use any suitable protocol depending on type and level of layer, e.g. as indicated by the Open Systems Interconnection (OSI) model, as understood by the person skilled in the art.

When a credit threshold is reached or fallen below, it is not possible to continue with all communication services for a long time. To increase the user experience, it will be an advantage if the subscriber is asked which service he wants to continue with using the remaining balance. When a credit threshold is reached or fallen below, the subscriber may be given an option to choose a service to continue with among all other concurrently ongoing services being used by him. The subscriber can prioritize any service of his choice. The subscriber may also be referred to as a user.

Figure 2A:
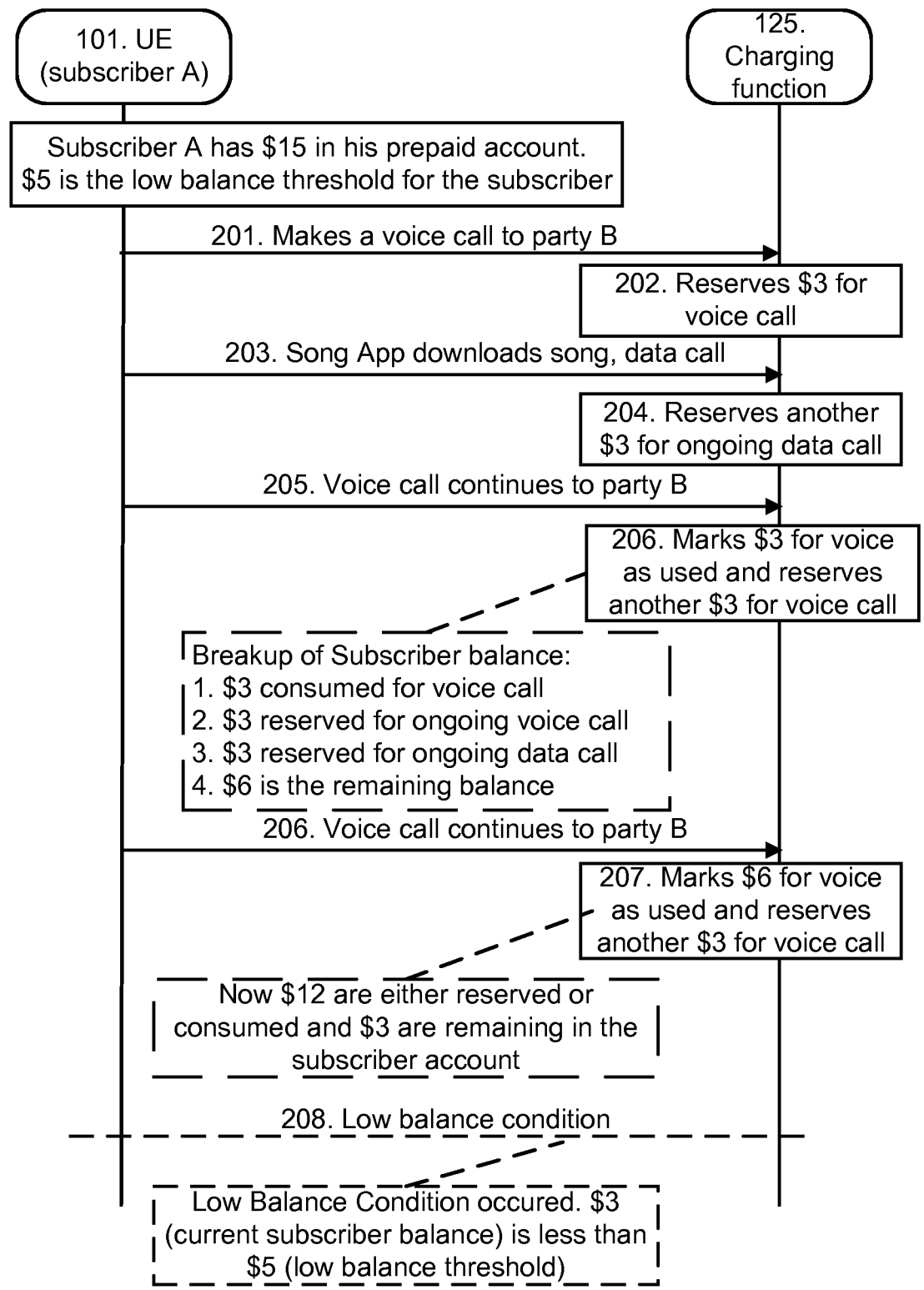
FIG. 2a is a signaling diagram illustrating an example method.
Figure 2B:
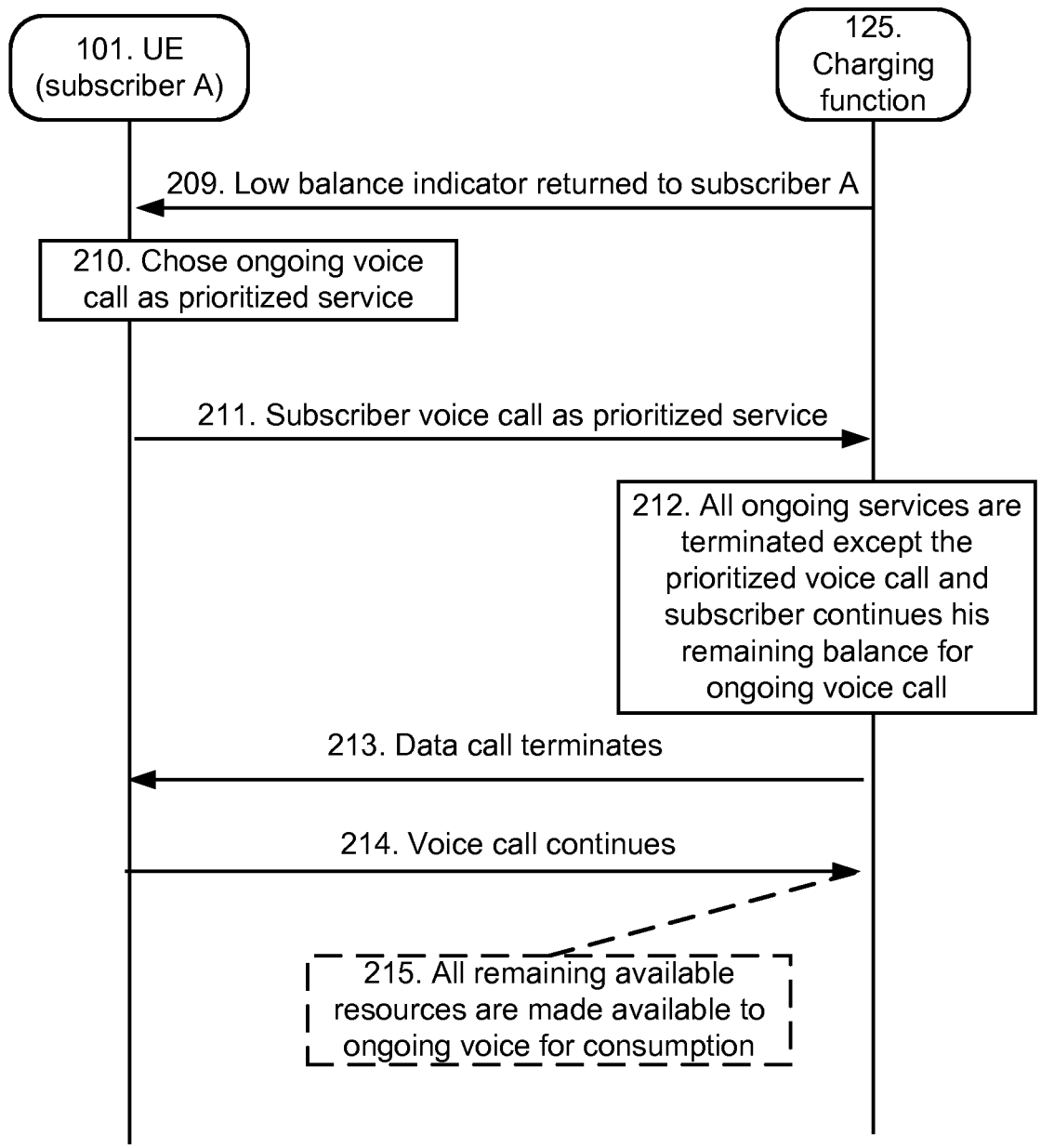

One example will now be described with reference to FIG. 2a and FIG. 2b. FIG. 2a illustrates steps 201-208 and FIG. 2b illustrates steps 209-214, i.e. FIG. 2b is a continuation of FIG. 2a. Suppose that a subscriber A has a UE 101 which is adapted for multitasking. When the UE 101 is adapted for multitasking, it may be referred to as a smart UE 101. The subscriber A is a prepaid subscriber with a current balance of $15. The subscriber A is making an international call to his friend in another country at the same time as a popular movie song app on his UE 101 is automatically downloading a movie song in the background. The friend is referred to as subscriber B. The subscriber A is consuming both data services and voice services at the same time. To charge the consumption of various ongoing communication services such as voice and data in real time, the subscriber A's account balance is continuously being reserved and decremented.

FIG. 2a and FIG. 2b show how various ongoing concurrent communication services such as voice and data consumed by the subscriber A are being charged in the telecommunication operator network. Assume that the prepaid subscriber A has $15 in his account. Also assume that the credit threshold for low balance for the subscriber A is $5. So, when the account balance of the subscriber A's account is $5 or below $5, the credit threshold is reached for the subscriber. The communication illustrated in FIGS. 2a and 2b are between the UE 101 and a charging node 125. The charging node 125 is associated with a certain telecommunication operator.

The method illustrated in FIGS. 2a and 2b comprises at least one of the following steps, which steps may be performed in any suitable order than described below:

Step 201

This step is seen in FIG. 2a. Subscriber A using his UE 101 makes a voice call to another subscriber, e.g. subscriber B. This may also be described as a UE 101 sends a communication service request to a charging node 125 associated with the subscriber A's telecommunication operator. The charging node 125 receives the communication service request from the UE 101. The requested communication service is exemplified with a voice call in FIG. 2a. The requested communication service may be referred to as a first communication service.

Step 202

This step is seen in FIG. 2a. The communication service request for the voice leads to a reservation of $3 for the voice service from the subscriber's prepaid account handled by the charging function 125.

Step 203

This step is seen in FIG. 2a. After steps 201 and 202, or in parallel with steps 201 and 202, a communication service request for data is sent from the UE 101 to the charging node 125. An example of a communication service request for data may be that a song app in the UE 101 downloads a song. This communication service request for data may be referred to as a second communication service request.

Step 204

This step is seen in FIG. 2a. The communication service request for the data leads to a reservation of another $3 for the ongoing data service from the subscriber A's prepaid credit account.

Step 205

This step is seen in FIG. 2a. The voice call started in step 201 continues.

Step 206

This step is seen in FIG. 2a. The subscriber quickly exhausts $3 for the voice call and again reserves further $3 for continuing with the voice service.

Till now, the following is a breakup of credit reservation out of the total $15 which is available in the subscriber's credit account:

$3 consumed for the voice call.
$3 reserved for the ongoing voice call service.
$3 reserved for the ongoing data service.
Till now $9 out of $15 are either consumed or reserved.

Step 206

This step is seen in FIG. 2a. The voice call continues from subscriber A to subscriber B. With this, the UE 101 sends a request to commit further reservation of another $3 to the charging function 125.

Step 207

This step is seen in FIG. 2a. Now as the voice call progress, a request to commit further reservation of another $3 comes in to continue the voice call. Now $12 are either reserved or consumed and $3 are remaining in the subscriber account.

Step 208

This step is seen in FIG. 2a. The credit reservation request in steps 206 and 207 will create a condition for low balance, as, after this reservation, the account balance of subscriber A is reduced to $3 which is less than low balance threshold value of $5.

Step 209

This step is seen in FIG. 2b. The charging function 125 sends a low balance indicator to the UE 101.

Step 210

This step is seen in FIG. 2b.

With the existing technology the charging function 125 would either force the subscriber A to abort the call early or do a refill so that he has sufficient balance to continue his communication.

With the embodiments herein, the subscriber is asked to prioritize his ongoing voice call so that his voice call can get the maximum of remaining credit units when there is shortage of credit units (low balance condition). Credit units reserved by other sessions are made available to the voice service. Making the credit units available to the voice service may happen automatically without any intervention by the subscriber A, allowing the subscriber A to continue with his voice call to the maximum time without any disruption. It is up to the subscriber A to prioritize any ongoing service over others during the low balance condition.

Step 211

This step is seen in FIG. 2b. The UE 101 sends, to the charging function 125, information indicating that the voice call is the prioritized service.

Step 212

This step is seen in FIG. 2b. The charging function 125 initiates termination of ongoing services except the prioritized voice call.

Step 213

This step is seen in FIG. 2b. The charging function 125 may send, to the UE 101, information indicating the termination of ongoing services except the prioritized voice call.

Step 214

This step is seen in FIG. 2b. Subscriber A continues his remaining balance for the ongoing voice call. All remaining available resources are made available to ongoing voice for consumption. The subscriber A can later resume his services as before by doing refill and increase his account balance thus moving away from the low balance state.

The example in FIGS. 2a and 2b is for a pre-paid credit account, but the example is also applicable to a post-paid credit account when the account balance is near to an allowed maximum credit limit, and then the subscriber services may be throttled if the maximum credit limit is exhausted.

In the embodiments herein, during usage of multiple services consuming balance from same account balance and when a credit threshold is reached or fallen below, the UE 101 is notified that "You have reached a low balance condition". Then the user of the UE 101 is asked to prioritize one of the ongoing communication services being consumed concurrently by him. If user wish, he can proceed to choose any one service of his choice to continue with among all concurrently ongoing services. If the user of the UE 101 does not choose any service, then a predefined or preconfigured fallback priority may be used. In case there is no fallback priority, the charging function 125 may apply a legacy method. Based on the user selection or based on a fallback priority, one of the ongoing services will keep on going while the rest are all terminated.

Figure 3:
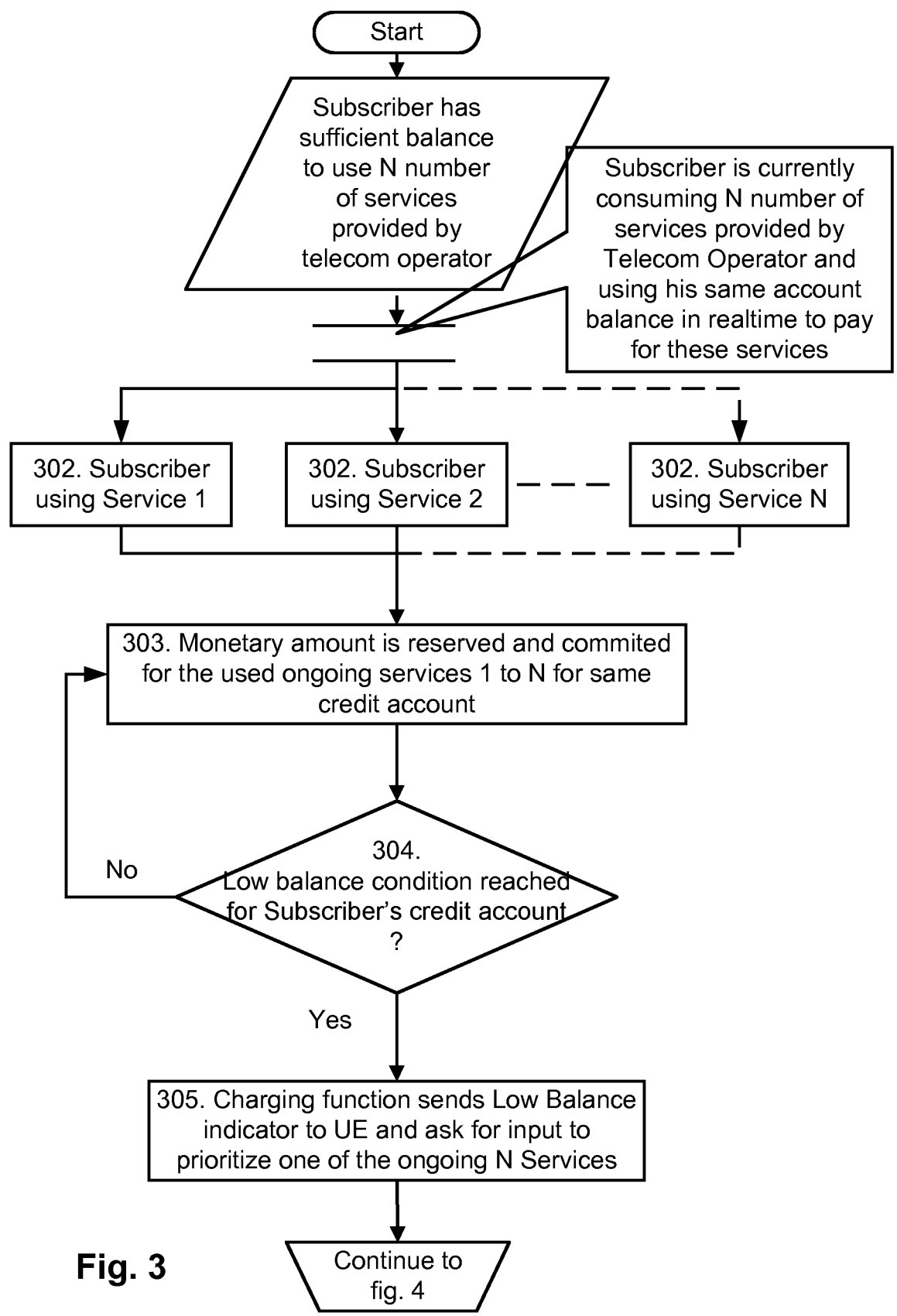
FIG. 3 is a signaling diagram illustrating an example method.
Figure 4:
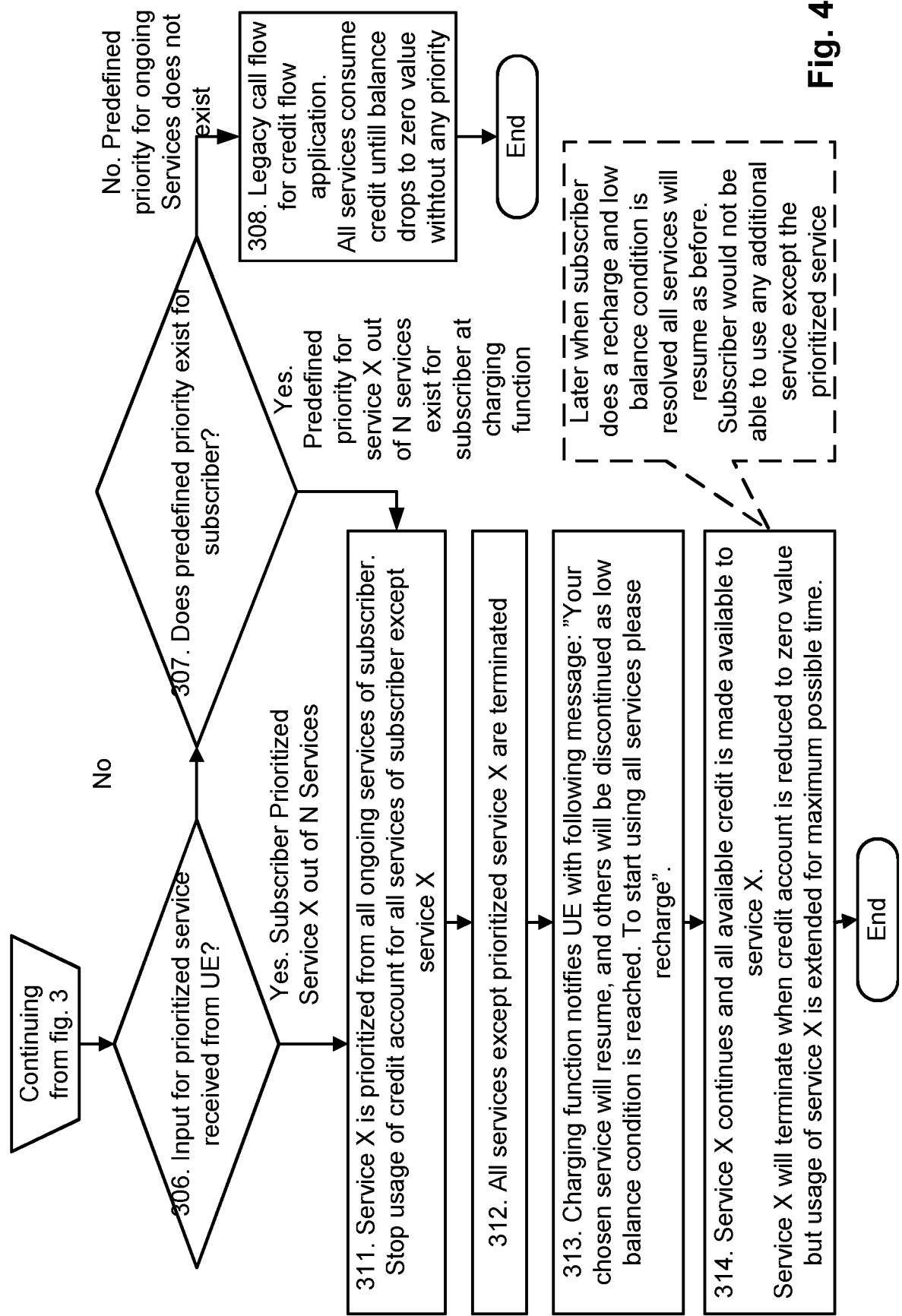
FIG. 4 is a continuation of FIG. 3.

FIG. 3 and FIG. 4 is a generic flow chart illustrating the embodiments herein. FIG. 3 illustrates steps 302-305 and FIG. 4 illustrates steps 306-314, i.e. FIG. 4 may be seen as a continuation of FIG. 3. One difference between FIGS. 3 and 4, and FIGS. 2a and 2b described above is that FIGS. 3 and 4 illustrates the fallback priority. Note that this does not mean that the embodiments illustrated in FIGS. 2a and 2b does not have a fallback priority, but FIGS. 2a and 2b does not show the fallback priority for sake of simplicity. The fallback priority maybe present in the embodiment shown in FIGS. 2a and 2b in the same way as it is illustrated in FIGS. 3 and 4.

The subscriber has sufficient balance on his credit account to use N number of communication services provided by the telecommunication operator, where N is any positive integer. The subscriber is currently consuming the N number of services provided by the telecommunication operator and is using his same credit account in real-time to pay for these communication services.

The method illustrated in FIGS. 3 and 4 comprises at least one of the following steps, which steps are performed in any suitable order than described below:

Step 302

This step is seen in FIG. 3. This step corresponds to steps 201, 203, 205 and 206 in FIGS. 2a and 2b. The subscriber uses multiple communication service on at least one UE 101. In FIG. 3, it is exemplified that the subscriber uses 1, 2, . . . N communication services, where N is a positive integer.

Step 303

This step is seen in FIG. 3. This step corresponds to steps 202, 204, 206 and 207 in FIGS. 2a and 2b. A monetary amount is reserved and committed from the credit account for the used ongoing services 1 to N for same subscriber balance. This step is performed by the credit function 125.

Step 304

This step is seen in FIG. 3. This step corresponds to step 208 in FIG. 2a. The charging function 125 checks if the low balance condition has been reached for the subscriber's credit account balance, i.e. the current balance in the credit account has credit threshold has been reached or fallen below. The method goes back to step 303 if the credit threshold has not been reached, indicated with "no" in FIG. 3. The method proceeds to step 305 if the credit threshold has been reached or fallen below, indicated with "yes" in FIG. 3.

Step 305

This step is seen in FIG. 3. This step corresponds to step 209 in FIG. 2b. This step is performed if the credit threshold has been reached or fallen below, indicated with "yes" in FIG. 3. The charging function 125 sends a low balance indicator to UE 101 and asks for input to prioritize one of the ongoing N communication services.

Step 306

This step is seen in FIG. 4. This step corresponds to steps 210 and 211 in FIG. 2b. The charging function 125 checks if it has received any input for a prioritized communication service from the UE 101. The method proceeds to step 307 if no input has been received, indicated with "no" in FIG. 4. The method proceeds to step 311 if input has been received, indicated with "yes" in FIG. 4.

Step 307

This step is seen in FIG. 4. The step is performed if the charging function 125 has not received any input for a prioritized communication service from the UE 101. The charging function 125 checks if a predefined priority exist for the subscriber. The fallback priority may also be referred to as a fallback priority, a predetermined priority or a default priority. The predefined priority may be defined by the subscriber via the UE 101 at subscription start, before communication service usage, by customer login on self-service portal etc. The telecommunication operator may also predefine the priorities for various services defined in its network for all or some set of subscribers.

The method proceeds to step 308 if a fallback priority does not exist, indicated with "no" in FIG. 4. The method proceeds to step 311 if a fallback priority exist, indicated with "yes" in FIG. 4.

Step 308

This step is seen in FIG. 4. This step if a predefined priority does not exist, indicated with "no" in FIG. 4, i.e. when priority for any ongoing communication service is not found by the charging function 125. A legacy call flow is performed for the credit flow application when there is no predefined priority. The legacy call flow comprises that all ongoing communication services consume credit until the balance drops to zero value without any priority.

Step 311

This step is seen in FIG. 4. This step corresponds to step 212 in FIG. 2b. This step may be performed if the charging function 125 has received input for priority in step 306, i.e. when the UE 101 has sent information indicating that communication service X is prioritized out of N communication services. This step may be performed if the charging function 125 has a predefined priority, as checked in step 307, i.e. when a predefined priority for communication service X out of N communication services exist for the subscriber at the charging function 125. The predefined priority may be predefined by the UE 101 at some previous time instance before step 302, it may be predetermined by the charging function 125 etc.

Communication service X is prioritized from all ongoing communication services for the subscriber. The charging function 125 initiates stop of the usage of the subscriber's credit account for all communication services except the prioritized communication service X.

Step 312

This step is seen in FIG. 4. This step corresponds to step 213 in FIG. 2b. All services except the prioritized service X are terminated.

Step 313

This step is seen in FIG. 4. The charging function 125 sends a notification to the UE 101 with the following message: "Your chosen service will resume, and others will be discontinued as low balance condition is reached. To start using all services please recharge".

Step 314

This step is seen in FIG. 4. The prioritized communication service X continues and all available credit is made available to communication service X. The communication service X will terminate when the credit account is reduced to zero value, but the usage of service X is extended for maximum possible time.

Later when the subscriber does a recharge of its credit account has exceeded the credit threshold all services will resume as before. The subscriber would not be able to use any additional service except the prioritized service before the recharge if this configuration is either enabled by the subscriber or the telecommunication operator.

Figure 5A:
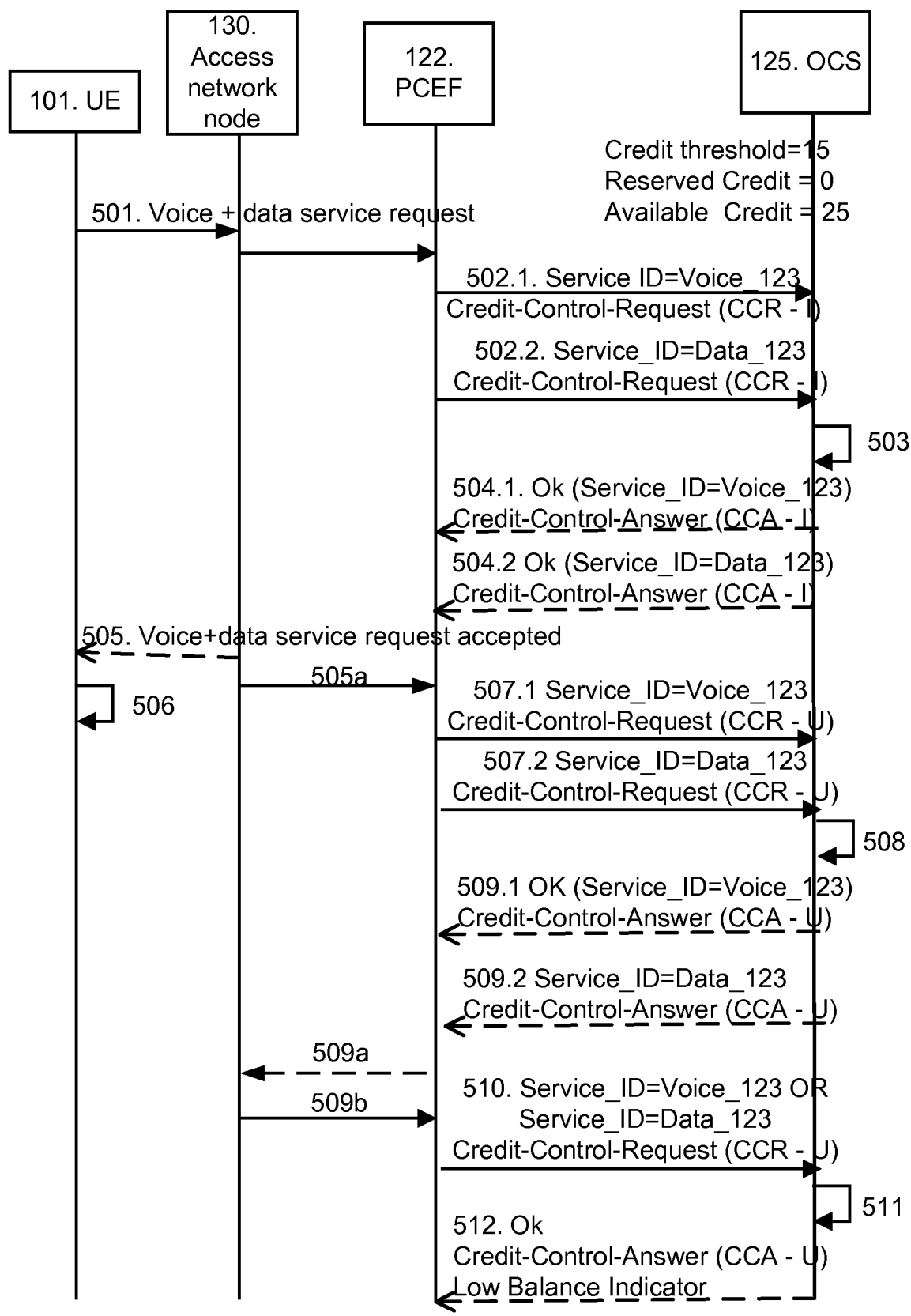
FIG. 5a is a signaling diagram illustrating an example method.
Figure 5B:
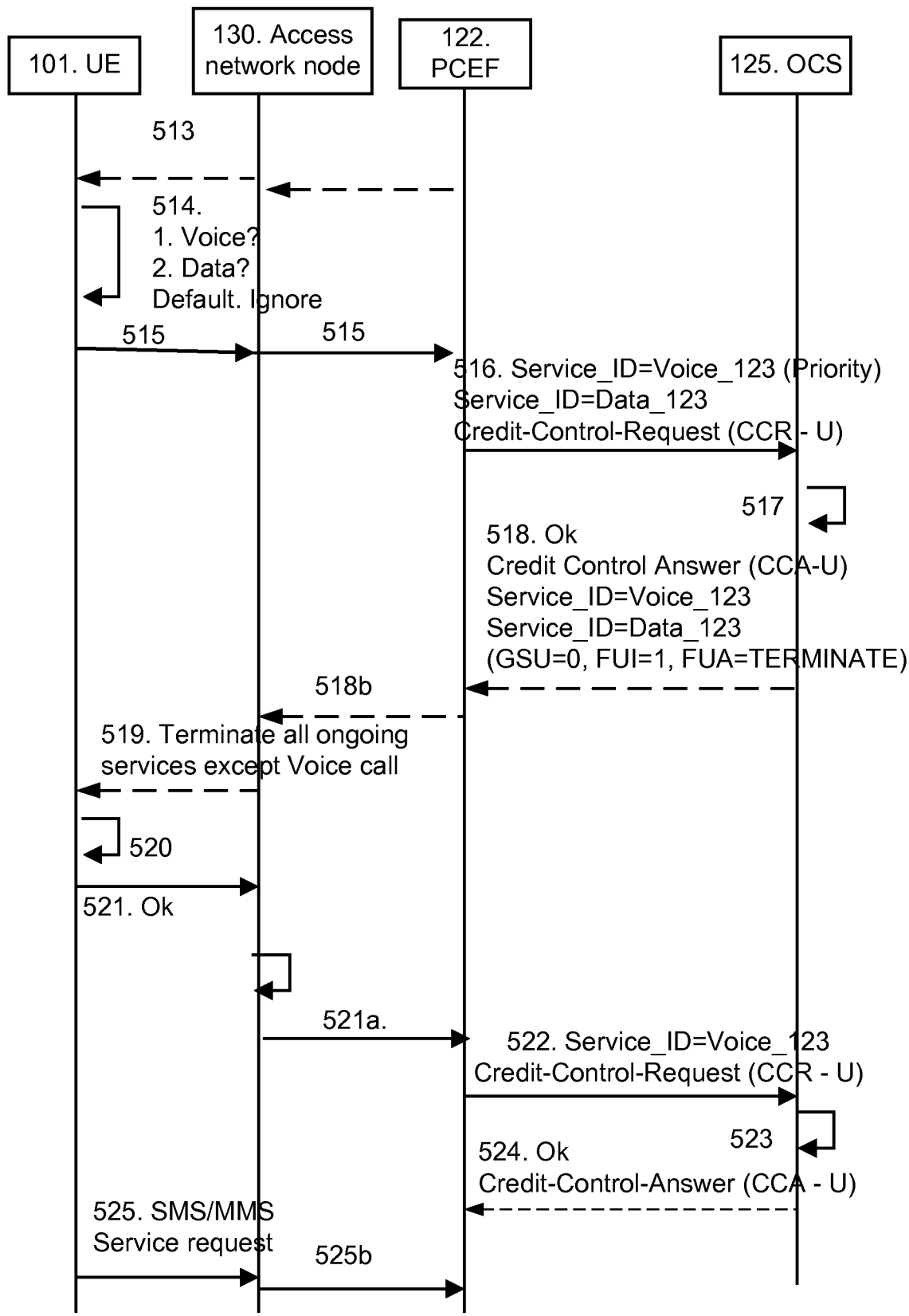
Figure 5C:
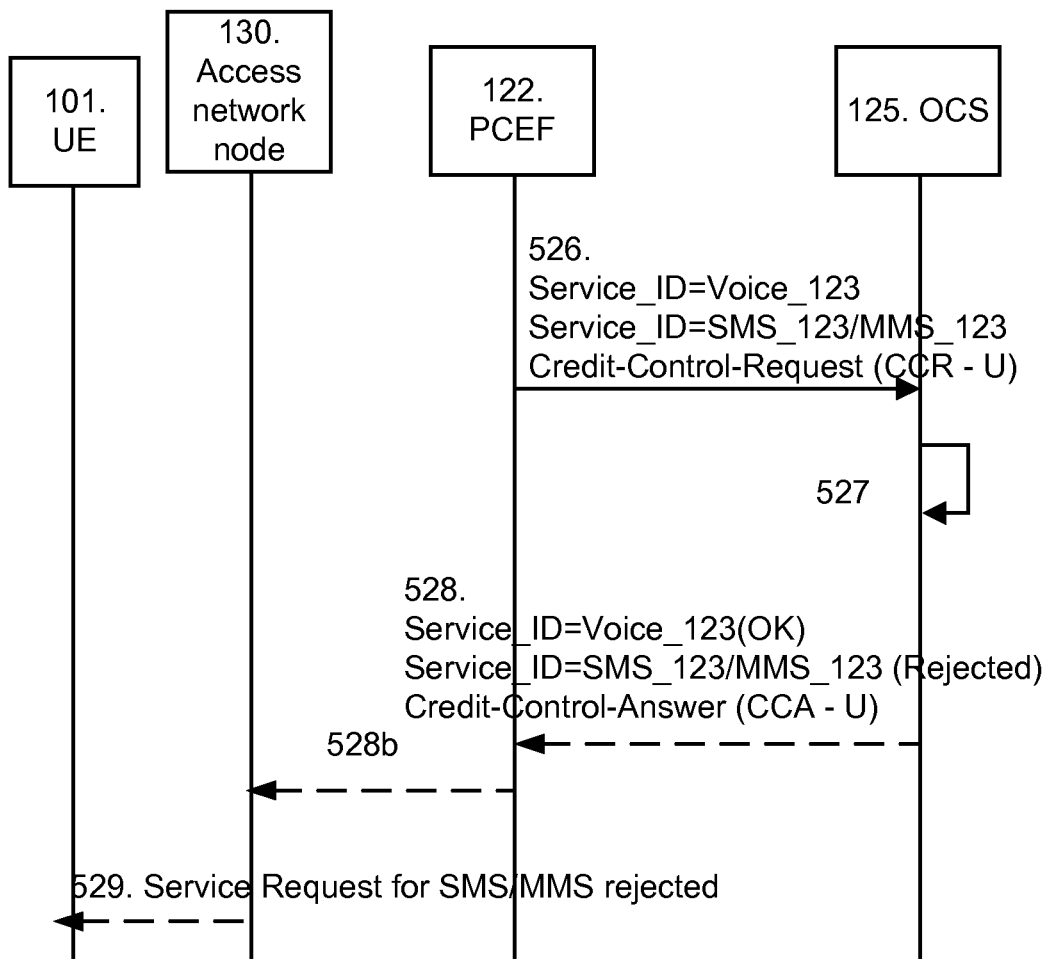
FIG. 5c is a continuation of FIG. 5b.

The embodiments herein may also be illustrated with the signaling diagrams in FIG. 5a, FIG. 5b and FIG. 5c. FIGS. 5a, 5b and 5c illustrate that the subscriber can be allowed optimum use of credit in case of a low balance condition. FIG. 5a illustrates steps 501-512, FIG. 5b illustrates steps 513-525 and FIG. 5c illustrates steps 526-259. FIG. 5b may be seen as a continuation of FIG. 5a, and FIG. 5c may be seen as a continuation of FIG. 5b. The dotted lines in FIGS. 5a, 5b, and 5c may represent responses or acknowledgement of earlier requests or they may represent to convey information back to the network entities or nodes.

The Diameter based Credit Control method in a 4G network is used as an example in FIGS. 5a, 5b and 5c, however the example is equally applicable to REST based NF-CHF communication in a 5G network. For the Diameter based 4G example in FIGS. 5a, 5b and 5c, the charging function 125 is exemplified with an OCS and the policy node 122 is exemplified with a PCEF.

For brevity, not all method steps are shown in FIGS. 5a, 5b and 5c. For instance, the following scenarios are not illustrated but may still be performed:

An authorization lifetime expires, re-authorization flow during ongoing session.

Error scenarios including recovery action for Subscriber balance.

Before step 501, the following example balance for the credit account is assumed:

Credit threshold=15
Reserved credit=0
Available credit=25

The method illustrated in FIGS. 5a, 5b and 5c comprises at least one of the following steps, which steps may be performed in any suitable order than described below:

Step 501

This step is seen in FIG. 5a. This step corresponds to steps 201, 203, 205 and 206 in FIG. 2a and step 302 in FIG. 3. The UE 101 sends a voice and data service request to the PCEF 122. The request may be sent via the telecommunication network, e.g. the access network node 130. The access network node 130 may be for example a Radio Access Network (RAN) node, an evolved NB (eNB, e NodeB), a gNB, a Base Transceiver Station (BTS), Radio Network Controller (RNC), Radio Base Station (RBS) etc.

Step 502.1-502.2

These steps are seen in FIG. 5a. Step 501 above may lead to a credit authorization request sent from the PCEF 122 to the OCS 125 to start the voice session and the data session for the UE 101. Step 502.1 is the request message for the voice service and step 502.2 is the request for the data service. The following Credit Control Request (CCR) message is sent from the PCEF 112 to the OCS 125:

Step 502.1:

```
<Credit-Control-Request> ::=
{ CC-Request-Type } = INITIAL_REQUEST
*[ Multiple-Services-Credit-Control ]
*[ Service-Identifier ] = Voice_123
[ Requested-Service-Unit ]
[ Rating-Group ]
```

Step 502.2:

```
*[ Service-Identifier ] = Data_123
[ Requested-Service-Unit ]
[ Rating-Group ]
```

Step 503

This step is seen in FIG. 5a. The OCS 125 performs a credit authorization logic and reserves credits for the data service and the voice service from the respective resource pools.

Step 504.1-504.2

These steps are seen in FIG. 5a. These steps are response of steps 502.1-502.2 with the confirmation of reserved units. The OCS 125 may send the Credit Control Answer (CCA) messages to the PCEF 122. Step 504.1 is the response message for the voice service and step 504.2 is the response for the data service.

Step 504.1:

```
<Credit-Control-Answer> ::=
{ CC-Request-Type } = INITIAL_REQUEST
*[ Multiple-Services-Credit-Control ]
*[ Service-Identifier ] = Voice_123
[ Granted-Service-Unit ]
[ Rating-Group ]
[ Result-Code ] = 1
```

Step 504.2:

```
*[ Service-Identifier] = Data_123
[ Granted-Service-Unit ]
[ Rating-Group ]
[ Result-Code ] = 1
```

Step 505

This step is seen in FIG. 5a. The PCEF 122 sends, to the UE 101, possibly via the telecommunication network represented by the access network node 130, information indicating that the voice and data communication service request has been accepted. Thus, in response of step 501, the UE 101 is informed that it is allowed to use the voice service and data communication service that was requested.

Step 505a

The telecommunication network, e.g. represented by the access network node 130, communicates to the PCEF 122 that reserved credits for requested services are consumed and there is a need to commit and reserve further credits to continue rendering service.

Step 506

This step is seen in FIG. 5a. 1. The UE 101 starts using the voice and data communication services.

Step 507.1-507.2

These steps are seen in FIG. 5a. After the reserved quota of credit is consumed, a further credit authorization and request for used service is sent from the PCEF 122 to the OCS 125. Step 507.1 is for the voice service and step 507.2 is for the data service. The following CCR-Update (CCR-U) request is sent from the PCEF 122 to the OCS 125:

Step 507.1:

```
<Credit-Control-Request> ::=
{ CC-Request-Type } = UPDATE_REQUEST
*[ Multiple-Services-Credit-Control ]
*[ Service-Identifier ] = Voice_123
[ Requested-Service-Unit ]
[ Used-Service-Unit ]
[ Rating-Group ]
```

Step 507.2:

```
*[ Service-Identifier ] = Data_123
[ Requested-Service-Unit ]
[ Used-Service-Unit ]
[ Rating-Group ]
```

Step 508

This step is seen in FIG. 5a. The OCS 125 performs commit logic for the requested service unit and a further credit authorization for the requested service unit, and reserves credits for the data service and the voice service from the respective resource pools.

Step 509.1-509.2

These steps are seen in FIG. 5a. The OCS 125 may send a response to the requests in step 507.1 and 507.2 to the PCEF 122 with the confirmation of reserved credit units. Step 509.1 is for the voice service and step 509.2 is for the data service. The following CCA-Update (CCA-U) response may be sent from the OCS 125 to the PCEF 122:

Step 509.1:

```
<Credit-Control-Answer> ::=
{ CC-Request-Type } = UPDATE_REQUEST
*[ Multiple-Services-Credit-Control ]
```

-continued

```
*[ Service-Identifier ] = Voice_123
[ Granted-Service-Unit ]
[ Rating-Group ]
[ Result-Code ] = 1
```

Step 509.2:

```
*[ Service-Identifier ] = Data_123
[ Granted-Service-Unit ]
[ Rating-Group ]
[ Result-Code ] = 1
```

Step 509*a*

The PCEF 122 sends a response to the telecommunication network represented by the access network node 130. The step is a response to the request in step 505*a*.

Step 509*b*

The telecommunication network represented by the access network node 130 sends a request to the PCEF 122. The request may be an iterative request, and may be the same as the request in step 505*a*. The request in step 509*b* may be sent until the low balance condition indication arrives.

Step 510

This step is seen in FIG. 5*a*. After the reserved quota of credit is consumed again, a further credit authorization and commit request for the used service is sent from the PCEF 122 to the OCS 125. At least one of the following CCR request messages is sent from the PCEF 122 to the OCS 125:

```
<Credit-Control-Request> ::=
{ CC-Request-Type } = UPDATE_REQUEST
*[ Multiple-Services-Credit-Control ]
*[ Service-Identifier ] = Voice_123
[ Requested-Service-Unit ]
[ Used-Service-Unit ]
[ Rating-Group ]
*[ Service-Identifier ] = Data_123
[ Requested-Service-Unit ]
[ Used-Service-Unit ]
[ Rating-Group ]
```

Step 511

This step is seen in FIG. 5*a*. This step corresponds to step 208 in FIG. 2*a* and step 304 in FIG. 3. The OCS 125 performs commit logic for the granted service unit and performs a further credit authorization for the requested service unit. The OCS 125 reserves credits for the data service and the voice service from the respective resource pools. This time, due to further reservation of units, a predefined credit threshold is reached or fallen below. The OCS 125 will add this information in the step 512 (response to step 510).

Step 512

This step is seen in FIG. 5*a*. This step corresponds to step 209 in FIG. 2*b* and step 305 in FIG. 3. The OCS 125 may send a response, to the PCEF 122, of the request in steps 507.1-507.2 and/or step 510 with the confirmation of reserved units. A "Low-Balance-Indication" Attribute-Value Pairs (AVP) may be comprised in response as the subscriber's credit account balance has reached or fallen below a credit threshold.

```
<Credit-Control-Answer> ::=
{ CC-Request-Type } = UPDATE_REQUEST
[ Low-Balance-Indication ]
*[ Multiple-Services-Credit-Control ]
*[ Service-Identifier ] = Voice_123
[ Granted-Service-Unit ]
[ Rating-Group ]
[ Result-Code ] = 1
*[ Service-Identifier ] = Data_123
[ Granted-Service-Unit ]
[ Rating-Group ]
[ Result-Code ] = 1
```

The response may be further sent from the PCEF 112 to the telecommunication network.

Step 513

This step is seen in FIG. 5*b*. The PCEF 122 may communicate to the UE 101 via the telecommunication network that the credit threshold has been reached or fallen below. The telecommunication network may be represented by the access network node 130.

Step 514

This step is seen in FIG. 5*b*. The UE 101 may be asked, e.g. in the form of a pop-up message, a voice message, a SMS, USSD other any other suitable message format, which service to continue with, e.g. voice or data. The UE 101 prefers to continue with the voice service and agrees to terminate the ongoing data service. In other words, a request for prioritization of one of the ongoing services is sent to the UE 101. The request may be in the form of a message.

Here one of the possible ways to choose the priority is exemplified. Though, there can be other ways also to choose the priority. For example, if the UE 101 is mobile, then a request in the form of tones/vibration may be more appropriate, and if the UE is a tablet computer, then the request may be in the form of a flash message notification for notifying the user that the threshold has been reached or fallen below. USSD or IVR may also be possible ways to get user's input of priority. In general, priority is dynamically chosen at run time by the user of the UE 101.

If the user of the UE 101 has not chosen any prioritization among the ongoing services, then a fall back method may be performed. For more detail on the fallback method, please see FIG. 6 which will be described later.

Step 515

This step is seen in FIG. 5*b*. This step corresponds to steps 210 and 211 in FIG. 2*b* and step 306 in FIG. 4. The UE's 101 priority of service selection is communicated to the PCEF 122, possibly via the telecommunication network which is represented by the access network node 130.

Step 516

This step is seen in FIG. 5*b*. This step corresponds to steps 210 and 211 in FIG. 2*b* and step 306 in FIG. 4. The PCEF 122 conveys the user's priority to the OCS 125 by adding newly proposed AVP in a CCR message, where the newly proposed AVP is new with the embodiments herein:

```
<Credit-Control-Request> ::=
{ CC-Request-Type } = UPDATE_REQUEST
*[ Multiple-Services-Credit-Control ]
*[ Service-Identifier ] = Voice_123
[ Service-Identifier-Priority ] = 1      //subscriber chosen highest priority,
New AVP
[ Requested-Service-Unit ]
[ Used-Service-Unit ]
[ Rating-Group ]
*[ Service-Identifier ] = Data_123
```

-continued

```
[ Requested-Service-Unit ]
[ Used-Service-Unit ]
[ Rating-Group ]
```

Step 517

This step is seen in FIG. 5*b*. This step corresponds to step 212 in FIG. 2*b* and step 311 in FIG. 4. Since the CCR received at the OCS 125 in step 516 comprises the "Service-Identifier-Priority" AVP, the OCS 125 does not authorize any further credit to any service except the service with "Service-Identifier=Voice_123" with Service-Identifier-Priority=1.

Step 518

This step is seen in FIG. 5*b*. The OCS 125 may send, to the PCEF122, a response to the request in step 516 with the confirmation of reserved units.

```
<Credit-Control-Answer> ::=
  { CC-Request-Type } = UPDATE_REQUEST
  *[ Multiple-Services-Credit-Control ]
    *[ Service-Identifier ] = Voice_123
    [ Granted-Service-Unit ]
    [ Rating-Group ]
    [ Result-Code ] = 1
  *[ Service-Identifier ] = Data_123
    [Validity-Time] = 0
    [ Granted-Service-Unit ] = 0
    [ Final-Unit-Indication ] = 1
    [ Final-Unit-Action ] = TERMINATION_REQUEST
    Rating-Group ]
    [ Result-Code ] = 1
```

Step 518*b*

Step 518*b* is a response to step 515. The PCEF 122 sends a response to the telecommunication network with information about which service will be continued and which will be stopped. The telecommunication network may be represented by the access network node 130.

Step 519

This step is seen in FIG. 5*b*. This step corresponds to step 312 in FIG. 4. This step may be divided into the following two sub steps:

Step 519.1 (now shown in FIG. 5*b*): Telecommunication network represented by the access network node 130 may terminate all ongoing services of the user except Voice, due to Service-Identifier=Voice_123. This is communicated to the UE 101.

Step 519.2 (not shown in FIG. 5*b*): The PCEF 122 may send a CCR-U to the OCS 125 to commit for the units that has been used till now, in AVP USU, for Service_ID=Data_123 and with no further demand to reserve any additional units, indicated with RSU=0.

With this, the OCS 125 will commit for used data services and will be able to release unused money that was reserved previously for data service to be used for prioritized service.

Step 520

This step is seen in FIG. 5*b*. The UE 101 takes the necessary actions for notifying the user.

Step 521

This step is seen in FIG. 5*b*. The UE 101 may acknowledge step 519.1 to the telecommunication network represented by the access network node 130.

Step 521*a*

This step is seen in FIG. 5*b*. The telecommunication network represented by the access network node 130 ensures that user of the UE 101 should be notified informing him, "Your chosen service will resume, and others will be discontinued as low balance condition is reached. To start using all services please recharge". The OCS 125 may add a new logic ensuring this notification to be sent.

Step 522

This step is seen in FIG. 5*b*. After the reserved quota of credit is consumed for voice, a further credit authorization and commit request for used voice service is sent from the PCEF 122 to the OCS 125. The CCR sent from the PCEF 122 to the OCS 125 is as follows:

```
<Credit-Control-Request> ::=
  { CC-Request-Type } = UPDATE_REQUEST
  *[ Multiple-Services-Credit-Control ]
    *[ Service-Identifier ] = Voice_123
    [ Requested-Service-Unit ]
    [ Used-Service-Unit ]
    [ Rating-Group ]
```

Step 523

This step is seen in FIG. 5*b*. The OCS 125 performs commit logic for granted service unit and further credit authorization for the requested service unit, and reserves credits for voice service from the respective resource pools. The commit logic is logic at the OCS which ensures to update the account balance for the service usage till this point of time.

Step 524

This step is seen in FIG. 5*b*. The OCS 125 may send, to the PCEF 122, the following response to the request in step 522, with the confirmation of reserved units:

```
<Credit-Control-Answer> ::=
  { CC-Request-Type } = UPDATE_REQUEST
  *[ Multiple-Services-Credit-Control ]
    *[ Service-Identifier ] = Voice_123
    [ Granted-Service-Unit ]
    [ Rating-Group ]
    [ Result-Code ] = 1
```

Step 525

This step is seen in FIG. 5*b*. The user of the UE 101 wants to send a SMS/MMS for which the UE 101 sends a SMS/MMS service request to the telecommunication network represented by the access network node 130.

Step 525*b*

This step is seen in FIG. 5*b*. The telecommunication network propagates a credit control request for un-prioritized service to the PCEF 122. The telecommunication network may be represented by the access network node 130.

Step 526

This step is seen in FIG. 5*c*. 26. Step 525 above leads to a credit authorization request to be sent from the PCEF 122 to the OCS 125 to send a SMS/MMS. Please note that the voice service is already ongoing for the UE 101. The request sent from the PCEF 122 to the OCS 125 may be as follows:

```
<Credit-Control-Request> ::=
  { CC-Request-Type } = UPDATE_REQUEST
  *[ Multiple-Services-Credit-Control ]
    *[ Service-Identifier ] = Voice_123
    [ Requested-Service-Unit ]
    [ Used-Service-Unit ]
    [ Rating-Group ]
    *[ Service-Identifier ] = SMS_123/MMS_123
```

```
[ Requested-Service-Unit ]
[ Used-Service-Unit ]
[ Rating-Group ]
```

Step 527

This step is seen in FIG. 5*c*. The CCR received at the OCS 125 in step 526 comprises a credit reservation request for SMS/MMS along with the ongoing voice. The OCS 125 checks if a priority pre-exists for any service. If yes, then the OCS 125 does not reserve any credit for SMS/MMS and rejects the credit authorization for requested service. If no, then the OCS 125 reserves credit for the requested service. In this example, the OCS 125 finds that priority is already set for the voice service, so credit will not be reserved for the SMS/MMS.

Step 528

This step is seen in FIG. 5*c*. The OCS 125 may send, to the PCEF 122, a response of step 527 with the confirmation of reserved units. The response may be as follows:

```
<Credit-Control-Answer> ::=
{ CC-Request-Type } = UPDATE_REQUEST
*[ Multiple-Services-Credit-Control ]
*[ Service-Identifier ] = Voice_123
[ Granted-Service-Unit ]
[ Rating-Group ]
[ Result-Code ] = 1
*[ Service-Identifier ] = SMS_123/MMS_123
[ Granted-Service-Unit ] = 0
```

Step 528*b*

This step is seen in FIG. 5*c*. Step 528*b* is a response to step 525*b*. The PCEF 122 sends a response to the telecommunication network represented by the access network node 130. The response may comprise rejected service information with the rejection reason.

Step 529

This step is seen in FIG. 5*c*. In response to step 525, the user may not be allowed to use SMS/MMS service that was requested. The telecommunication network represented by the access network node 130 may in such case send a service request for SMS/MMS rejected to the UE 101.

The OCS 125 will start granting additional service requests once the balance in the credit account is above the threshold, since the user has made a payment or recharge.

The prioritization of one of the multiple ongoing communication services may be transmitted from the UE 101 to the charging function 125 in any suitable message or parameter. The prioritization provides priority information for the current service id. For example, the prioritization may be transmitted in an Information Element (IE), an Attribute Value Pair (AVP), a TAG etc. The IE, the AVP or the TAG may be a new IE or AVP or TAG, or it may be a modification of an existing IE or AVP or TAG.

In an example with a new IE or AVP or TAG, the IE or AVP or TAG may be named "Service-Identifier-Priority". The new IE or AVP or TAG may be of type Unsigned32.

In an example with modification of an existing AVP, the AVP may be for example as follows in the CCR message:

```
<Credit-Control-Request> ::= < Session-Id >
{ Origin-Host }
{ Origin-Realm }
{ Destination-Realm }
{ Auth-Application-Id }
{ Service-Context-Id }
{ CC-Request-Type }
{ CC-Request-Number }
[ Destination-Host ]
[ User-Name ]
[ CC-Sub-Session-Id ]
[ Acct-Multi-Session-Id ]
[ Origin-State-Id ]
[ Event-Timestamp ]
*[ Subscription-Id ]
{ Subscription-Id-Type }
{ Subscription-Id-Data }
[ Service-Identifier ]
   [Service-Identifier-Priority] //subscriber chosen highest priority,
   New AVP
[ Termination-Cause ]
[ Requested-Service-Unit ]
[ CC-Time ]
[ CC-Money ]
{ Unit-Value }
[ Currency-Code ]
[ CC-Total-Octets ]
[ CC-Input-Octets ]
[ CC-Output-Octets ]
[ CC-Service-Specific-Units ]
*[ AVP ]
[ Requested-Action ]
*[ Used-Service-Unit ]
[ Tariff-Change-Usage ]
[ CC-Time ]
[ CC-Money ]
{ Unit-Value }
[ Currency-Code ]
[ CC-Total-Octets ]
[ CC-Input-Octets ]
[ CC-Output-Octets ]
[ CC-Service-Specific-Units ]
*[ AVP ]
[ Multiple-Services-Indicator ]
*[ Multiple-Services-Credit-Control ]
[ Requested-Service-Unit ]
[ CC-Time ]
[ CC-Money ]
{ Unit-Value }
[ Currency-Code ]
[ CC-Total-Octets ]
[ CC-Input-Octets ]
[ CC-Output-Octets ]
[ CC-Service-Specific-Units ]
*[ AVP ]
*[ Used-Service-Unit ]
[ Tariff-Change-Usage ]
[ CC-Time ]
[ CC-Money ]
{ Unit-Value }
[ Currency-Code ]
[ CC-Total-Octets ]
[ CC-Input-Octets ]
[ CC-Output-Octets ]
[ CC-Service-Specific-Units ]
*[ AVP ]
*[ Service-Identifier ]
[ Rating-Group ]
*[ AVP ]
*[ Service-Parameter-Info ]
{ Service-Parameter-Type }
{ Service-Parameter-Value }
[ CC-Correlation-Id ]
[ User-Equipment-Info ]
{ User-Equipment-Info-Type }
{ User-Equipment-Info-Value }
*[ Proxy-Info ]
*[ Route-Record ]
*[ AVP ]
```

As mentioned earlier, if the charging function does not receive a chosen priority among the ongoing services from the UE after the low balance condition has occurred, then a fallback method may be performed. The fallback method may involve use of a predefined priority or use of a legacy method. The following are some possible scenarios where a fallback method may be used:

- When the subscriber did not dynamically select a priority among the ongoing service after the low balance condition has occurred. A time out occurred may lead to execution of a fallback method.
- When the network has not implemented any methods for the subscriber to dynamically select priority among the ongoing service when the low balance condition occurred. This may lead to execution of a fallback method.

The fallback method may comprise predefining a subscriber's personalized priorities of subscribed communication services for example at a user portal, e.g. self-care. These predefined personalized priorities may be used as fallback priority for ongoing subscribed communication services of the user when the low balance condition of the subscriber's credit account balance is reached.

Figure 6:
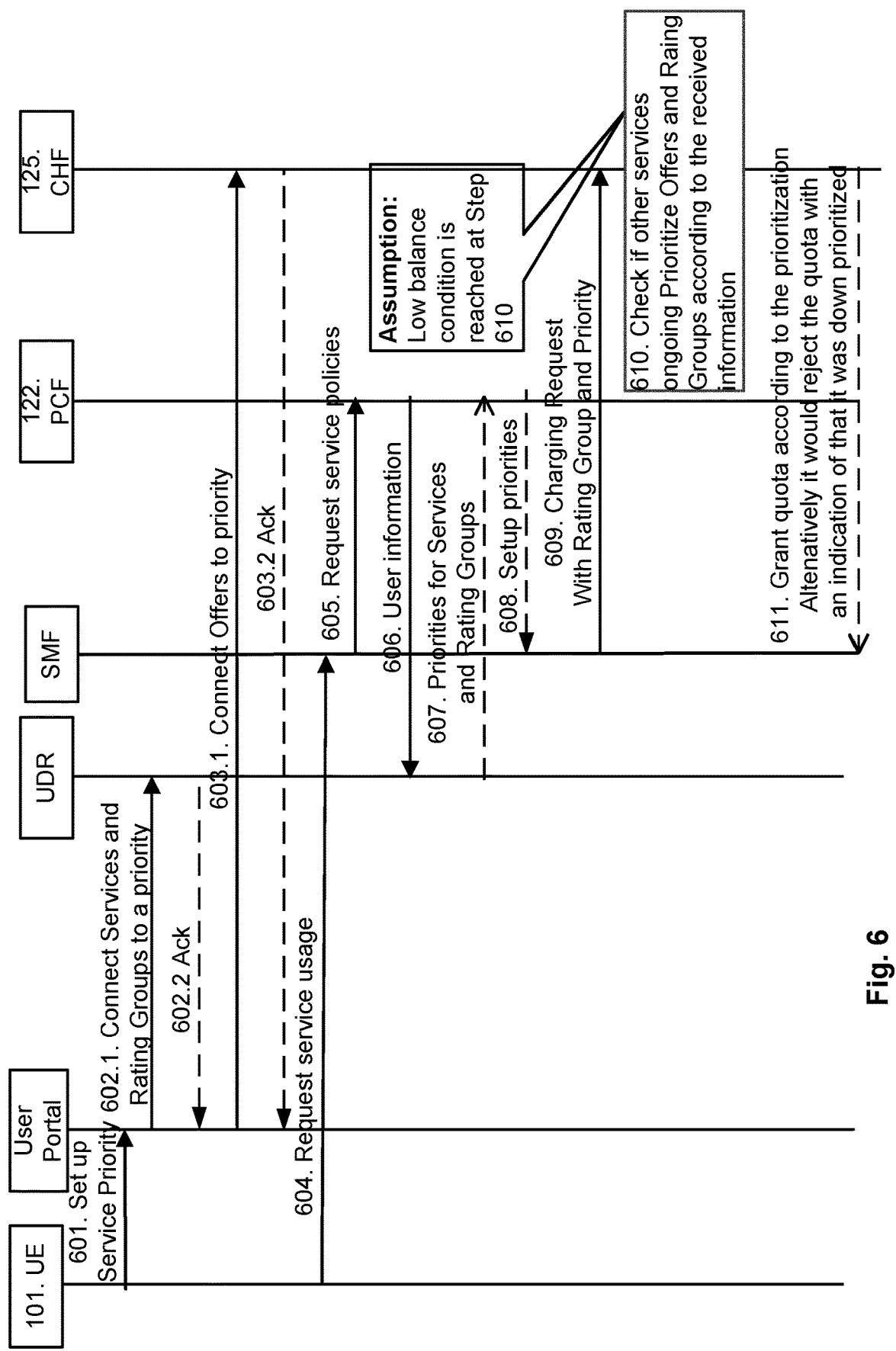
FIG. 6 is a signaling diagram illustrating an example method with a fallback method.

FIG. 6 is a signaling diagram illustrating an example of a fallback method. In FIG. 6, the charging function 125 is exemplified with a CHF 125 and the policy node 122 is exemplified with a PCF 122. The method shown in FIG. 6 comprises at least one of the following steps, which steps may be performed in any suitable order than described below:

Steps 601 to step 603 shown in FIG. 6 and described below are for the predefining of the personalized priorities of subscribed communication services of the subscriber:

Step 601

The subscriber may use a user portal (self-care) on the UE 101 to setup the priorities of its subscribed communication services, i.e. the subscriber predefines its priorities using the UE 101. The user portal may be a webpage or a it may be a portal provided by the telecommunication operator where the user can login and configure his priorities.

Step 602.1

The user portal sends the personalized priorities services and rating groups from the subscriber to a memory. In the example illustrated in FIG. 6, the memory is exemplified with a Unified Data Repository (UDR). In the UDR, services and rating groups are connected to a priority. Services and rating groups are related in that a rating group may exist for a priority.

Step 602.2

The memory may send an acknowledgement of the stored priorities.

Step 603.1

The user portal sends the personalized priorities of the subscribed communication services to the charging function 125 for storing.

Step 603.2

The charging function 125 may send an acknowledgement of the stored priorities.

Step 604 to step 611 shown in FIG. 6 and described below show how the predefined personalized priorities of the subscribed communication services of the subscriber may be used when the low balance condition is reached, and when no priority input has been dynamically received from the UE 101 after the low balance condition has been reached:

Step 604

The subscriber requests the network for services usage. In other words, the UE 101 sends, triggered by the subscriber, a request for service usage to the SMF. The services usage mentioned in step 604 is the amount of $ calculated by the charging function 125. Step 604 represents the credit authorization request for the requested service.

Step 605

The SMF requests the PCF 122 to retrieve requested service policies.

Step 606

The PCF 122 requests the UDR to provide the predefined personalized priorities of requested communication services and rating groups of that subscriber. In other words, the PCF 122 sends a request for predefined user information to the UDR.

Step 607

In response of step 606 above, the UDR may respond with the predefined priorities for requested communication services and rating groups.

Step 608

In response of step 605 above, the PCF 122 may provide the SMF with the requested predefined priorities to the SMF. In other words, the PCF 122 may send the predefined setup priorities to the SMF.

The predefined priorities received in step 608 may be used by the SMF in the request to the CHF 125 for the reservation of credits in the credit balance to consume services requested by the subscriber.

Step 609

The SMF sends a charging request of requested communication services with rating group and predefined priorities to the CHF 125.

The difference between the priorities in step 603.1 and step 609 is that step 603.1 sends static prioritization information of offers at the charging function 125, while step 609 represents credit authorization request with priority information of offers.

Step 610

During the charging request processing at the CHF 125, a low balance condition is reached. This step may be performed when the CHF 125 has not dynamically received any priority information from the UE 101 after the low balance condition has been reached. The CHF 125 may use the predefined priorities to decide which of the requested service should be allocated resource from the credit account. In other words, the CHF 125 checks if any ongoing communication services should be prioritized according to the received predefined priority information from step 603.1, other than the one associated with the request in step 609.

Step 611

In response of step 609 above, the CHF 125 responds to the SMF with at least one of the following information:

- A quota granted for the predefined prioritized communication service, and/or
- A quota rejected for a down prioritized communication service with an indication of that it was down prioritized.

The above fallback method is exemplified above considering a 5G network. The same fallback method is equally applicable to 4G, e.g. LTE, and other networks, where one difference is that other network nodes are involved.

Below shows some examples of protocols, messages and entities which may be involved in the embodiments herein when used in a 2G, 3G, 4G and 5G communication system:

| Communication system | AAA protocol | Message with priority information | Parameter carrying priority information | 122. Policy node | 125. Charging function |
|---|---|---|---|---|---|
| 2G | N/A | INAP | Protocol attributes | N/A | SCP/CS |
| 3G | N/A | INAP/ CAMEL | Protocol attributes | | SCP/CS |

| Communication system | AAA protocol | Message with priority information | Parameter carrying priority information | 122. Policy node | 125. Charging function |
|---|---|---|---|---|---|
| 4G | Diameter | CCR | AVP | PCRF | OCS/OFCS |
| 5G | REST | REST | TAG | PCF | CHF |

Figure 7:
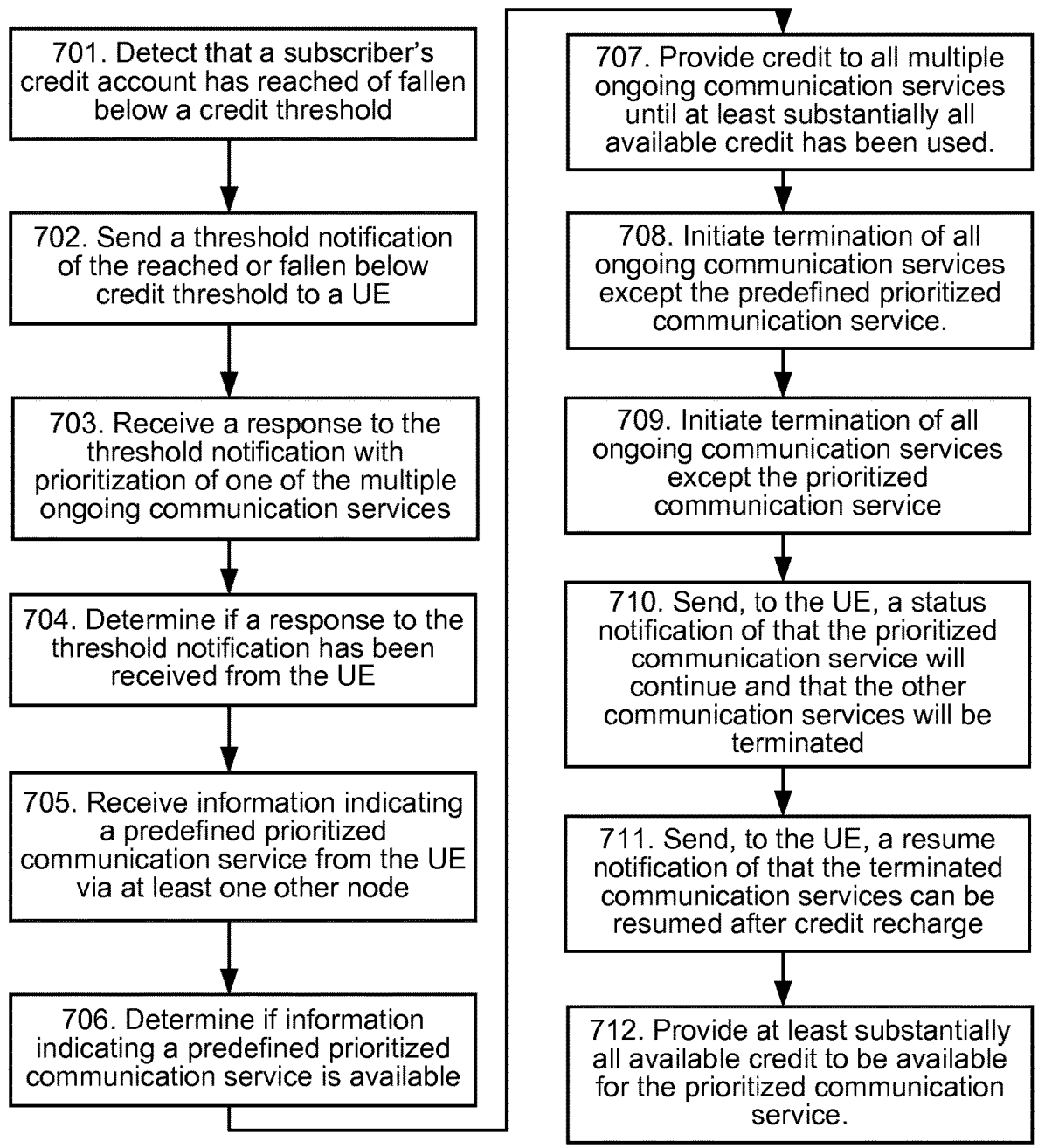
FIG. 7 is a flow chart illustrating a method performed by a charging function.

The method described above will now be described seen from the perspective of the charging function 125. FIG. 7 is a flowchart describing the present method performed by the charging function 125 for handling a subscriber's communication services. The charging function 125 may be for example an OCS 107 or a CHF. The method comprises at least one of the following steps to be performed by the charging function 125, which steps may be performed in any suitable order than described below:

Step 701

This step corresponds to step 208 in FIG. 2a, step 304 in FIG. 3, step 511 in FIG. 5a and step 610 in FIG. 6. The charging function 125 detects that a subscriber's credit account has reached or fallen below a credit threshold when the subscriber has multiple ongoing communication services consuming credit from the credit account.

The multiple ongoing communication service may be on one or multiple UEs 101. The balance on the same credit account is being consumed for all multiple ongoing services. The credit threshold may also be referred to as a low balance threshold or a credit limit threshold.

Step 702

This step corresponds to step 209 in FIG. 2b, step 305 in FIG. 3 and step 512 in FIG. 5a. The charging function 125 sends a threshold notification of the reached or fallen below credit threshold to a UE 101 on which the subscriber has at least one of the multiple ongoing communication services.

The threshold notification may comprise a request for prioritization of one of the multiple ongoing communication services.

Step 703

This step corresponds to step 211 in FIG. 2b and steps 515 and 516 in FIG. 5b. The charging function 125 may receive, from the UE 101, a response to the threshold notification with prioritization of one of the multiple ongoing communication services.

Step 704

This step corresponds to step 306 in FIG. 4. The charging function 125 determines if a response to the threshold notification has been received from the UE 101 with prioritization of one of the multiple ongoing communication services.

Step 705

This step corresponds to steps 601 and 602 in FIG. 6. The charging function 125 may receive information indicating a predefined prioritized communication service from the UE 101 via at least one other node. The at least one other node may be for example a UDR, a PCF, a SMF etc.

Step 706

This step corresponds to step 307 in FIG. 4. The charging function 125 may, if a response with prioritization of one communication service has not been received, determine if information indicating a predefined prioritized communication service is available.

The reason for not receiving any response with prioritization may be that the user of the UE 101 has not provided any response, a timeout, that there is no mechanism implemented in the network for the user to send and select prioritization.

Step 707

This step corresponds to step 308 in FIG. 4. If information indicating a predefined prioritized communication service is not available, the charging function 125 may provide credit to all multiple ongoing communication services until at least substantially all available credit has been used.

Step 708

This step corresponds to step 311 in FIG. 4. The charging function 125 may, if information indicating the predefined prioritized communication service is available, initiate termination of all ongoing communication services except the predefined prioritized communication service.

Step 709

This step corresponds to step 212 in FIG. 2b, steps 311 and 312 in FIG. 4, and steps 517, 518 and 519 in FIG. 5b. If a response with prioritization of one communication service has been received, the charging function 125 initiates terminations of all ongoing communication services except the prioritized communication service.

Step 710

This step corresponds to step 213 in FIG. 2b, step 313 in FIG. 4 and steps 518 and 519 in FIG. 5b. The charging function 125 may send, to the UE 101, a status notification of that the prioritized communication service will continue and that the other communication services will be terminated.

Step 711

This step corresponds to step 213 in FIG. 2b and step 313 in FIG. 4. The charging function 125 may send, to the UE 101, a resume notification of that the terminated communication services can be resumed after credit recharge.

Step 712

This step corresponds to step 215 in FIG. 2b and step 314 in FIG. 4. The charging function 125 provides at least substantially all available credit to be available for the prioritized communication service. This may also be described as reserving or allocating at least substantially all available credit to be available for the prioritized communication service. In other words, the charging function 125 makes the remaining credit available for the prioritized communication service.

Figure 8:
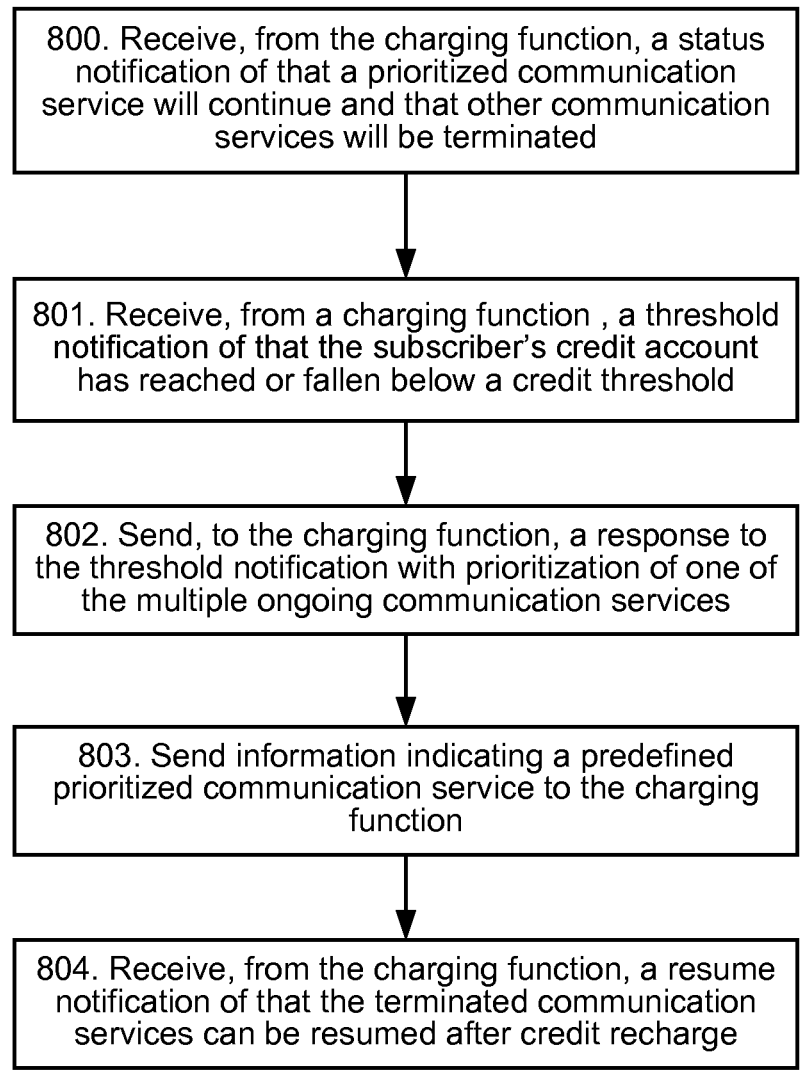
FIG. 8 is a flow chart illustrating a method performed by a UE.

The method described above will now be described seen from the perspective of the UE 101. FIG. 8 is a flowchart describing the present method performed by the UE 101 for handling a subscriber's communication services. The subscriber has at least one of multiple ongoing communications services ongoing on the UE 101. The method comprises at least one of the following steps to be performed by the UE 101, which steps may be performed in any suitable order than described below:

Step 800

This step corresponds to step 204 in FIG. 2a, step 213 in FIG. 2b, step 313 in FIG. 4 and steps 518 and 519 in FIG. 5b. The UE 101 may receive, from the charging function 125, a status notification of that a prioritized communication service will continue and that other communication services will be terminated.

Step 801

This step corresponds to step 209 in FIG. 2b, step 305 in FIG. 3 and step 512 in FIG. 5a. The UE 101 receives, from a charging function 125, a threshold notification of that the subscriber's credit account has reached or fallen below a credit threshold for multiple ongoing communication services consuming credit from the same credit account.

The threshold notification may comprise a request for prioritization of one of the multiple ongoing communication services.

The multiple ongoing communication service may be on one or multiple UEs 101. The balance on the same credit account is being consumed for all multiple ongoing services.

The credit threshold may also be referred to as a low balance threshold or a credit limit threshold.

Step 802

This step corresponds to step 211 in FIG. 2b and steps 515 and 516 in FIG. 5b. The UE 101 may send, to the charging function 125, a response to the threshold notification with prioritization of one of the multiple ongoing communication services.

Step 803

This step corresponds to steps 601, 602, 607, 608 and 609 in FIG. 6. The UE 101 may send information indicating a predefined prioritized communication service to the charging function 125 via at least one other node.

Step 804

This step corresponds to step 213 in FIG. 2b and step 313 in FIG. 4. The UE 101 may receive, from the charging function 125, a resume notification of that the terminated communication services can be resumed after credit recharge.

Figure 9:
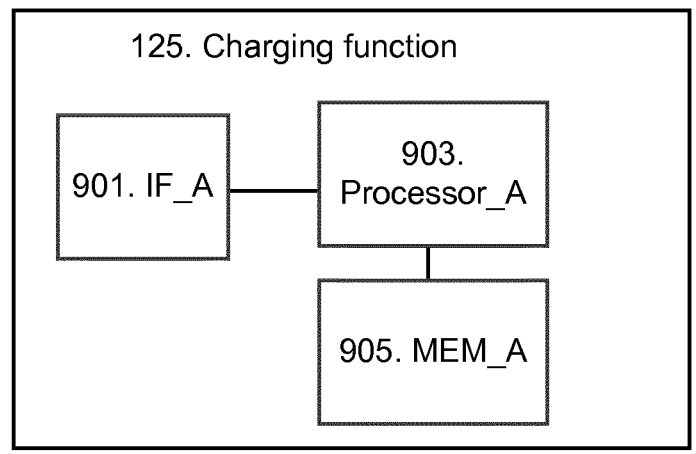
FIG. 9 is a schematic block diagram illustrating an example of a charging function.

To perform the method steps shown in FIGS. 2-7 for handling a subscriber's communication services, the charging function 125 may comprise an arrangement as shown in FIG. 9. The charging function 125 comprises an interface (IF_A) 901, a processor_A 903 and a memory (MEM_A) 905, in which memory instructions are stored for carrying out the method steps explained above. The charging function 125 communicates via the interface IF_A 901. The IF_A 901 comprises both an external interface, communicating with a transmitter and receiver, and internal interfaces (not shown).

The charging function 125 is configured to, e.g. by means of the processor_A 903, detect that a subscriber's credit account has reached or fallen below a credit threshold when the subscriber has multiple ongoing communication services consuming credit from the credit account.

The charging function 125 is configured to, e.g. by means of the IF_A 901, send a threshold notification of the reached or fallen below credit threshold to a UE 101 on which the subscriber has at least one of the multiple ongoing communication services. The threshold notification may comprise a request for prioritization of one of the multiple ongoing communication services.

The charging function 125 is configured to, e.g. by means of the processor_A 903, determine if a response to the threshold notification has been received from the UE 101 with prioritization of one of the multiple ongoing communication services.

The charging function 125 is configured to, e.g. by means of the processor_A 903, if a response with prioritization of one communication service has been received, initiate termination of all ongoing communication services except the prioritized communication service.

The charging function 125 is configured to, e.g. by means of the processor_A 903, provide at least substantially all available credit to be available for the prioritized communication service.

The charging function 125 may be configured to, e.g. by means of the IF_A 901, receive, from the UE 101, a response to the threshold notification with prioritization of one of the multiple ongoing communication services.

The charging function 125 may be configured to, e.g. by means of the processor_A 903, if a response with prioritization of one communication service has not been received, determine if information indicating a predefined prioritized communication service is available.

The charging function 125 may be configured to, e.g. by means of the processor_A 903, if information indicating the predefined prioritized communication service is available, initiate termination of all ongoing communication services except the predefined prioritized communication service.

The charging function 125 may be configured to, e.g. by means of the IF_A 901, receive information indicating a predefined prioritized communication service from the UE 101 via at least one other node.

The charging function 125 may be configured to, e.g. by means of the processor_A 903, if information indicating a predefined prioritized communication service is not available, provide credit to all multiple ongoing communication services until at least substantially all available credit has been used.

The charging function 125 may be configured to, e.g. by means of the IF_A 901, send, to the UE 101, a status notification of that the prioritized communication service will continue and that the other communication services will be terminated.

The charging function 125 may be configured to, e.g. by means of the IF_A 901, send, to the UE 101, a resume notification of that the terminated communication services can be resumed after credit recharge.

Figure 10:
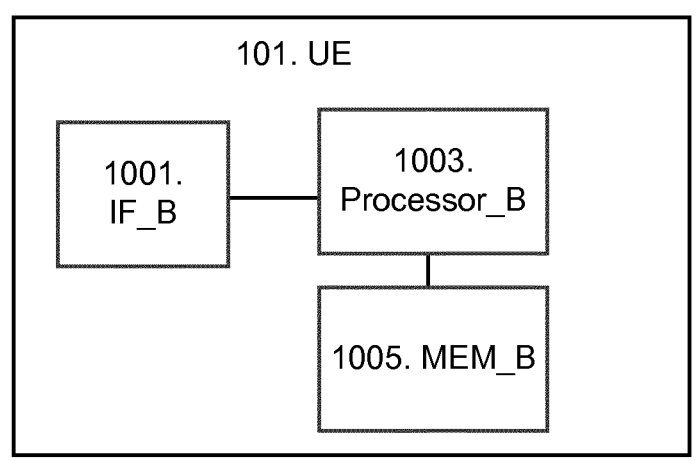
FIG. 10 is a schematic block diagram illustrating an example of a UE.

To perform the method steps shown in FIGS. 2-6 and 8 for handling a subscriber's communication services, the UE 101 may comprise an arrangement as shown in FIG. 10. The UE 101 comprises an interface (IF_B) 1001, a processor_B 1003 and a memory (MEM_B) 1005, in which memory instructions are stored for carrying out the method steps explained above. The UE 101 communicates via the interface IF_B 1001. The IF_B 1001 comprises both an external interface, communicating with a transmitter and receiver, and internal interfaces (not shown).

The UE 101 may be configured to, e.g. by means of the IF_B 1001, receive, from a charging function 125, a threshold notification of that the subscriber's credit account has reached or fallen below a credit threshold for multiple ongoing communication services on the UE 101 consuming credit from the same credit account. The threshold notification may comprise a request for prioritization of one of the multiple ongoing communication services.

The UE 101 may be configured to, e.g. by means of the IF_B 1001, send, to the charging function 125, a response to the threshold notification with prioritization of one of the multiple ongoing communication services.

The UE 101 may be configured to, e.g. by means of the IF_B 1001, receive, from charging function 125, a status notification of that a prioritized communication service will continue and that other communication services will be terminated.

The UE 101 may be configured to, e.g. by means of the IF_B 1001, receive, from the charging function 125, a resume notification of that the terminated communication services can be resumed after credit recharge.

The UE 101 may be configured to, e.g. by means of the IF_B 1001, send information indicating a predefined prioritized communication service to the charging function 125 via at least one other node.

The above apparatuses/entities are adapted to communicate over known external telecommunication interfaces or via application programming interfaces (API), as appropriate.

The present mechanism for handling a subscriber's communication services may be implemented through one or more processors, such as the processor_A 903 in the charging function arrangement depicted in FIG. 9 and the processor_B 1003 in the UE arrangement depicted in FIG. 10 together with computer program code for performing the functions of the embodiments herein. The processor may be for example a Digital Signal Processor (DSP), Application Specific Integrated Circuit (ASIC) processor, Field-programmable gate array (FPGA) processor or microprocessor. The program code mentioned above may also be provided as a computer program product, for instance in the form of a data carrier carrying computer program code for performing the embodiments herein when being loaded into the charging function 125 and/or UE 101. One such carrier may be in the form of a CD ROM disc. It is however feasible with other data carriers such as a memory stick. The computer program code can furthermore be provided as pure program code on a server and downloaded to the charging function 125 and/or UE 101.

A first computer program may comprise instructions which, when executed on at least one processor, cause the at least one processor, e.g. the processor_A 903, to carry out at least one of the method steps in at least one of FIGS. 2-7. A first carrier may comprise the computer program, and the first carrier is one of an electronic signal, optical signal, radio signal or computer readable storage medium.

A second computer program may comprise instructions which, when executed on at least one processor, cause the at least one processor, e.g. the processor_B 1003, to carry out at least one of the method steps in at least one of FIGS. 2-6 and 8. A second carrier may comprise the computer program, and the second carrier is one of an electronic signal, optical signal, radio signal or computer readable storage medium.

There is no way in current credit control application where a prepaid subscriber can prioritize one ongoing service over all other ongoing services when there is a shortage of credit units, i.e. when a low balance condition occurs.

The embodiments herein relate to providing the policy function with dynamically chosen priority information in case of a low balance, and then the policy function may select a priority communication service and drop the other ongoing communication services.

For credit authorization in an LTE network, e.g. 4G, a new AVP may be introduced in the CCR message of the diameter protocol to carry priority information of the communication service being used to the charging function 125.

For credit authorization in a 5G network, a new TAG may be introduced in a REST message towards charging function 125, e.g. the Nchf, to carry priority information of the communication service being used to the charging function 125, e.g. Nchf.

The embodiments herein are not limited to the above described embodiments. Various alternatives, modifications and equivalents may be used. Therefore, the above embodiments should not be taken as limiting the scope of the embodiments, which is defined by the appended claims. A feature from one embodiment may be combined with one or more features of any other embodiment.

The term "at least one of A and B" should be understood to mean "only A, only B, or both A and B.", where A and B are any parameter, number, indication used herein etc.

It should be emphasized that the term "comprises/comprising" when used in this specification is taken to specify the presence of stated features, integers, steps or components, but does not preclude the presence or addition of one or more other features, integers, steps, components or groups thereof. It should also be noted that the words "a" or "an" preceding an element do not exclude the presence of a plurality of such elements.

The term "configured to" used herein may also be referred to as "arranged to", "adapted to", "capable of" or "operative to".

It should also be emphasised that the steps of the methods defined in the appended claims may, without departing from the embodiments herein, be performed in another order than the order in which they appear in the claims.

The invention claimed is:

1. A method performed by a charging function of a communication network for handling communication services for a subscriber of the communication network, the method comprising:
    detecting that available credit in a credit account of the subscriber has reached or fallen below a credit threshold when the subscriber has multiple ongoing communication services consuming credit from the credit account;
    sending a threshold notification of the reached or fallen below credit threshold to a user equipment (UE) on which the subscriber has at least one of the multiple ongoing communication services;
    determining if a response to the threshold notification has been received from the UE with prioritization of one of the multiple ongoing communication services;
    based on determining that a response with prioritization of one communication service has been received, initiating termination of all ongoing communication services except the prioritized communication service;
    based on determining that a response with prioritization of one communication service has not been received, determining if information indicating a predefined prioritized communication service is available;
    based on determining that information indicating the predefined prioritized communication service is available, initiating termination of all ongoing communication services except the predefined prioritized communication service; and
    providing all available credit in the credit account to be available for the prioritized communication service or the predefined prioritized communication service.

2. The method according to claim 1, further comprising:
    receiving, from the UE, the response to the threshold notification with prioritization of one of the multiple ongoing communication services.

3. The method according to claim 1, further comprising:
    receiving the information indicating a predefined prioritized communication service from the UE via at least one other node.

4. The method according to claim 1, further comprising:
    based upon determining that information indicating a predefined prioritized communication service is not available, providing credit to all multiple ongoing communication services until all available credit in the credit account has been used.

5. The method according to claim 1, further comprising:
    sending, to the UE, a status notification that the prioritized communication service or the predefined prioritized communication service will continue and that other ongoing communication services will be terminated; and
    sending, to the UE, a resume notification that the terminated communication services can be resumed after credit recharge of the credit account.

6. The method according to claim 1, wherein the threshold notification comprises a request for prioritization of one of the multiple ongoing communication services.

7. A method performed by a user equipment (UE) for handling communication services for a subscriber of a communication network, wherein the subscriber has at least one of multiple ongoing communications services ongoing on the UE, the method comprising:
   receiving, from a charging function of the communication network, a threshold notification that available credit in a credit account of the subscriber has reached or fallen below a credit threshold needed for multiple ongoing communication services consuming credit from the credit account; and
   selectively using the available credit in the credit account for the following communication services, based on termination by the communication network of other ongoing communication services:
      a prioritized one of the multiple ongoing communication services, in response to sending the charging function a response, to the threshold indication, that indicates the prioritized communication service; and
      a predefined prioritized communication service, when no response indicating a prioritized one of the multiple ongoing communication services is sent to the charging function.

8. The method according to claim 7, further comprising:
   receiving, from the charging function, a status notification that the prioritized communication service or the predefined prioritized communication service will continue and that other ongoing communication services will be terminated; and
   receiving, from the charging function, a resume notification that the terminated communication services can be resumed after credit recharge of the credit account.

9. The method according to claim 7, wherein the threshold notification comprises a request for prioritization of one of the multiple ongoing communication services.

10. A user equipment (UE) comprising:
    at least one processor; and
    and at least one memory storing instructions that, when executed by the at least one processor, configure the UE to perform operations corresponding to the method of claim 7.

11. A charging function of a communication network, comprising:
    at least one processor; and
    and at least one memory storing instructions that, when executed by the at least one processor, configure the charging function to:
       detect that available credit in a credit account of a subscriber of the communication network has reached or fallen below a credit threshold when the subscriber has multiple ongoing communication services consuming credit from the credit account;
       send a threshold notification of the reached or fallen below credit threshold to a user equipment (UE) on which the subscriber has at least one of the multiple ongoing communication services;
       determine if a response to the threshold notification has been received from the UE with prioritization of one of the multiple ongoing communication services;
       based on a determination that a response with prioritization of one communication service has been received, initiate termination of all ongoing communication services except the prioritized communication service;
       based on a determination that a response with prioritization of one communication service has not been received, determine if information indicating a predefined prioritized communication service is available; and
       based on a determination that information indicating the predefined prioritized communication service is available, initiate termination of all ongoing communication services except the predefined prioritized communication service; and
       provide all available credit in the credit account to be available for the prioritized communication service or the predefined prioritized communication service.

12. The charging function according to claim 11, wherein execution of the instructions further configures the charging function to:
    receive, from the UE, the response to the threshold notification with prioritization of one of the multiple ongoing communication services.

13. The charging function according to claim 11, wherein execution of the instructions further configures the charging function to:
    receive the information indicating a predefined prioritized communication service from the UE via at least one other node.

14. The charging function according to claim 11, wherein execution of the instructions further configures the charging function to:
    based on a determination that information indicating a predefined prioritized communication service is not available, provide credit to all multiple ongoing communication services until all available credit in the credit account has been used.

15. The charging function according to claim 11, wherein execution of the instructions further configures the charging function to:
    send, to the UE, a status notification that the prioritized communication service or the predefined prioritized communication service will continue and that other ongoing communication services will be terminated; and
    send, to the UE, a resume notification of that the terminated communication services can be resumed after credit recharge of the credit account.

16. The charging function according to claim 11, wherein the threshold notification comprises a request for prioritization of one of the multiple ongoing communication services.

* * * * *